(12) United States Patent
Cho

(10) Patent No.: US 10,503,637 B2
(45) Date of Patent: Dec. 10, 2019

(54) MEMORY SYSTEM AND SOC INCLUDING LINEAR REMAPPER AND ACCESS WINDOW

(71) Applicant: Dongsik Cho, Yongin-si (KR)

(72) Inventor: Dongsik Cho, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 120 days.

(21) Appl. No.: 14/696,573

(22) Filed: Apr. 27, 2015

(65) Prior Publication Data

US 2016/0124851 A1 May 5, 2016

(30) Foreign Application Priority Data

Oct. 29, 2014 (KR) .......................... 10-2014-0148426

(51) Int. Cl.
*G06F 12/06* (2006.01)

(52) U.S. Cl.
CPC ...... *G06F 12/0653* (2013.01); *G06F 12/0607* (2013.01); *G06F 2212/253* (2013.01); *G06F 2212/306* (2013.01); *G06F 2212/656* (2013.01); *Y02D 10/13* (2018.01)

(58) Field of Classification Search
CPC ............. G06F 12/0653; G06F 12/0607; G06F 2212/306; G06F 2212/656; G06F 2212/253; Y02B 60/1225

See application file for complete search history.

(56) References Cited

U.S. PATENT DOCUMENTS

| | | | |
|---|---|---|---|
| 5,920,898 A | 7/1999 | Bolyn et al. | |
| 7,139,862 B2 | 11/2006 | Hemming | |
| 7,266,651 B1* | 9/2007 | Cypher | G06F 9/34 711/157 |
| 7,996,597 B1* | 8/2011 | Venkatramani | G06F 12/0607 711/157 |
| 8,122,208 B2 | 2/2012 | Wang et al. | |
| 8,531,471 B2* | 9/2013 | Chen | G06F 9/544 345/541 |
| 2004/0133762 A1 | 7/2004 | Chao et al. | |

(Continued)

FOREIGN PATENT DOCUMENTS

| | | |
|---|---|---|
| CN | 103514100 A | 1/2014 |
| JP | 2008-152687 A | 7/2008 |

(Continued)

*Primary Examiner* — Rocio Del Mar Perez-Velez
(74) *Attorney, Agent, or Firm* — Volentine, Whitt & Francos, PLLC

(57) ABSTRACT

A system on chip which is connected with a plurality of memory chips includes first and second processors, a first access window, a first linear remapper, and a memory controller. The first and second processors are configured to provide an address for using the plurality of memory chips. The first access window sets an area, accessed only by the first processor, from among address areas of one or more of the plurality of memory chips. The first linear remapper remaps an address received from the first processor. The memory controller performs a partial linear access operation with respect to the plurality of memory chips, based on an area set by the first access window and an address remapped by the first linear remapper.

18 Claims, 26 Drawing Sheets

(56) References Cited

U.S. PATENT DOCUMENTS

| | | | |
|---|---|---|---|
| 2004/0168011 A1* | 8/2004 | Hemming | H03M 13/6566 |
| | | | 711/5 |
| 2007/0011421 A1 | 1/2007 | Keller, Jr. et al. | |
| 2007/0022261 A1 | 1/2007 | Young | |
| 2007/0180203 A1 | 8/2007 | Ramgarajan et al. | |
| 2010/0228923 A1 | 9/2010 | Lim | |
| 2010/0325374 A1 | 12/2010 | Cypher et al. | |
| 2011/0072190 A1* | 3/2011 | Borracini | G06F 12/0246 |
| | | | 711/103 |
| 2011/0145609 A1 | 6/2011 | Berard et al. | |
| 2012/0054455 A1 | 3/2012 | Wang et al. | |
| 2013/0339640 A1 | 12/2013 | Cho | |
| 2014/0025867 A1 | 1/2014 | Nishimori et al. | |
| 2015/0046732 A1* | 2/2015 | Chun | G06F 1/3275 |
| | | | 713/323 |
| 2015/0100746 A1* | 4/2015 | Rychlik | G06F 12/0607 |
| | | | 711/157 |
| 2016/0124849 A1 | 5/2016 | Cho | |

FOREIGN PATENT DOCUMENTS

| | | |
|---|---|---|
| JP | 5678273 B2 | 1/2015 |
| KR | 10-2013-0142941 A | 12/2013 |

* cited by examiner

FIG. 3

Memory Access Address

| | Interleaving Bit | | |
|---|---|---|---|
| MSB | ILB | Chunk | LSB |
| | 0 | 0 | 0 |
| | 0 | 0 | 1 |
| | 0 | 1 | 0 |
| Don't care | 0 | 1 | 1 |
| | 1 | 0 | 0 |
| | 1 | 0 | 1 |
| | 1 | 1 | 0 |
| | 1 | 1 | 1 |

MEMORY SYSTEM AND SOC INCLUDING LINEAR REMAPPER AND ACCESS WINDOW

CROSS-REFERENCE TO RELATED APPLICATIONS

A claim for priority under 35 U.S.C. § 119 is made to Korean Patent Application No. 10-2014-0148426 filed Oct. 29, 2014, in the Korean Intellectual Property Office, the entire contents of which are hereby incorporated by reference.

BACKGROUND

Embodiments of the application described herein relate to a memory system, and more particularly, relate to a memory system and a system on chip including a linear remapper and an access window.

A memory system may include two or more processors. For example, a mobile system may include a modem and an application processor (AP) (or, multimedia processor). A memory system that includes two or more processors may necessitate at least two or more memories for driving the processors, respectively.

In the above example, the modem may accompany a NOR flash memory for storing codes and a DRAM for executing the codes. The application processor may accompany a NAND flash memory for storing codes and data and a DRAM for executing the codes. Codes and data may be exchanged between the modem and the application processor through an interface, such as UART (Universal Asynchronous Receiver Transmitter), SPI (Serial Peripheral Interface), or SRAM interface.

The memory system may perform an interleaving access operation using two or more DRAMs. That is, the memory system accesses two or more memories in turn to improve its performance. The interleaving access system may have the following problem. In the event that performance is not problematic even though one DRAM in an interleaving access system is only accessed, power is unnecessarily consumed because two DRAMs are used.

SUMMARY

Embodiments of the application provide a memory system or a system on chip partially using a linear access operation during an interleaving access operation, thereby reducing unnecessary power consumption.

Embodiments of the application provide a memory system or a system on chip having an access window function within plural memory chips upon executing a partial linear access operation, thereby making it possible to use a memory efficiently.

One aspect of embodiments of the application is directed to provide a system on chip which is connected with a plurality of memory chips. The system on chip includes first and second processors configured to provide an address for using the plurality of memory chips; a first access window configured to set an area, accessed only by the first processor, from among address areas of one or more of the plurality of memory chips; a first linear remapper configured to remap an address received from the first processor; and a memory controller configured to perform a partial linear access operation with respect to the plurality of memory chips, based on the area set by the first access window and the address remapped by the first linear remapper.

The system on chip may further include a second access window configured to set an area, accessed only by the second processor, from among address areas of one or more of the plurality of memory chips; and a second linear remapper configured to remap an address received from the second processor and to provide an address thus remapped to the memory controller. The memory controller may perform a partial linear access operation with respect to the plurality of memory chips, based on the area set by the second access window and the address remapped by the second linear remapper.

The first access window may be connected between the first processor and the first linear remapper, and the second access window may be connected between the second processor and the second linear remapper.

The first access window may receive a first CONFIG signal from a special function register (SFR) and may set an independent access area that only the first processor accesses. The first CONFIG signal may include a start address and an end address of the independent access area. The first linear remapper may receive a second CONFIG signal from the SFR and may selectively perform an interleaving access operation or a linear access operation with respect to the plurality of memory chips.

Another aspect of embodiments of the application is directed to provide a method of accessing a plurality of memories connected with a system on chip including a plurality of processor. The method includes receiving an address for accessing one or more of the plurality of memories from a first processor of the plurality of processors; determining whether the address belongs to an independent access area of the first processor; and based on the determination result, performing a linear access operation with respect to the independent access area or issuing a decoding error response.

In the performing of a linear access operation, the first processor may only access an address area of one or more of the plurality of memories. The system on chip may further include a memory controller to control the plurality of memories. In the performing of a linear access operation, an address received from the first processor may be remapped, and an address thus remapped may be provided to the memory controller.

The system on chip may further include a first access window configured to control such that an access operation of the first processor is only performed with respect to an address area of one or more of the plurality of memories; and a first linear remapper configured to remap an address received from the first processor and to provide an address thus remapped to the memory controller. The memory controller may perform a partial linear access operation with respect to the plurality of memories based on the remapped address.

Still another aspect of embodiments of the application is directed to provide a memory system which includes a plurality of memory chips; and a system on chip connected with the plurality of memory chips. The system on chip includes first and second processors configured to provide an address for using the plurality of memory chips; a first access window configured to set an area, accessed only by the first processor, from among address areas of one or more of the plurality of memory chips; a first linear remapper configured to remap an address received from the first processor; and a memory controller configured to control a partial linear access operation with respect to the plurality of memory chips, based on the area set by the first access window and the address remapped by the first linear remapper.

The memory system may further include a second access window configured to set an area, accessed only by the second processor, from among address areas of one or more of the plurality of memory chips; and a second linear remapper configured to remap an address received from the second processor and to provide an address thus remapped to the memory controller. The memory controller may perform a partial linear access operation with respect to the plurality of memory chips, based on the area set by the second access window and the address remapped by the second linear remapper.

A partial linear access operation may be performed even though at least one of the plurality of memory chips has an asymmetric memory configuration including a non-accessible area. The first or second access window may set the non-accessible area. The first access window may receive a first CONFIG signal from a special function register and may set an independent access area that only the first processor accesses, and the first linear remapper may receive a second CONFIG signal from the SFR and may selectively perform an interleaving access operation or a linear access operation with respect to the plurality of memory chips.

The first processor may be a modem processor. The first and second processors, the memory controller, the first and second access windows, and the first and second linear remappers may be implemented on the system on chip. The first access window may receive a first CONFIG signal from a special function register and may set an independent access area that only the first processor accesses, and the first linear remapper may receive a second CONFIG signal from the SFR and may selectively perform an interleaving access operation or a linear access operation with respect to the plurality of memory chips.

A mobile electronic device is provided which includes a display panel configured to display image data; an RF transceiver unit configured to perform wireless data communications; a plurality of memory chips configured to store data; and an application processor connected to the display panel, the RF transceiver unit, and the plurality of memories. The application processor includes first and second processors configured to provide an address for using the plurality of memory chips; a first access window configured to set an area, accessed only by the first processor, from among address areas of one or more of the plurality of memory chips; a first linear remapper configured to remap an address received from the first processor; and a memory controller configured to perform a partial linear access operation with respect to the plurality of memory chips, based on the area set by the first access window and the address remapped by the first linear remapper.

The application processor may further include a second access window configured to set an area, accessed only by the second processor, from among address areas of one or more of the plurality of memory chips; and a second linear remapper configured to remap an address received from the second processor and to provide an address thus remapped to the memory controller. The memory controller may perform a partial linear access operation with respect to the plurality of memory chips, based on the area set by the second access window and the address remapped by the second linear remapper.

Another embodiment of the application is directed to provide a method of accessing memory chips. The method includes accessing, with a first processor, a first memory area within each of the memory chips through an interleaved access operation; and accessing, with a second processor, a second memory area within a first of the memory chips through a linear access operation. The second memory area is the same size or larger than the first memory area.

The method may further include accessing, with the second processor, a third memory area, within each of the memory chips through the interleaved access operation.

The method may further include accessing, with the first processor, a third memory area within a second of the memory chips, different from the first memory chip, using the linear access operation. The third memory area is the same size or larger than the first memory area.

The method may further include remapping a first range of memory addresses for accessing a third memory area within each of the memory chips to a second range of memory addresses used for accessing the second memory area within the first memory chip through the linear access operation.

If a memory region to be accessed by the second processor exceeds the size of the second memory area, the second processor may access the second memory area within the first memory chip through the linear access operation and may access a third memory area of a second of the memory chips, differing from the first memory chip, through the linear access operation.

The second processor may access the second memory area but the first processor does not, and both the first and second processors may access the first memory area.

Another embodiment of the application is directed to provide a memory system that accesses memory chips. The system includes a first processor that accesses a first memory area within each of the memory chips through an interleaved access operation; and a second processor that accesses a second memory area within a first of the memory chips through a linear access operation. The second memory area is the same size or larger than the first memory area.

The second processor may access a third memory area within each of the memory chips through the interleaved access operation.

The first processor may access a third memory area within a second of the memory chips, different from the first memory chip, using the linear access operation, and the third memory area is the same size or larger than the first memory area.

The system may further include a linear remapping component that remaps a first range of memory addresses for accessing a third memory area within each of the memory chips to a second range of memory addresses used for accessing the second memory area within the first memory chip through the linear access operation.

The second processor may access the second memory area but the first processor does not, and both the first and second processors may access the first memory area.

If a memory region to be accessed by the second processor exceeds the size of the second memory area, the second processor may access the second memory area within the first memory chip through the linear access operation and may access a third memory area of a second of the memory chips, differing from the first memory chip, through the linear access operation.

Another embodiment of the application is directed to a memory system including a plurality of memory chips and a system on chip connected with the plurality of memory chips. The system on chip includes: (1) first and second processors configured to provide an address for using the plurality of memory chips; (2) a first access window configured to set an area, accessed only by the first processor, from among address areas of one or more of the plurality of memory chips; (3) a first linear remapper configured to remap an address received from the first processor and to generate a remapped address; and (4) a memory controller configured to control a partial linear access operation with respect to the plurality of memory chips, based on the area set by the first access window and the address remapped by the first linear remapper. For each of the memory chips, the first linear remapper remaps consecutively increasing memory addresses of the memory chip to monotonically increasing memory addresses for accessing a first of the memory chips through the partial linear access operation.

Another embodiment of the application is directed to a mobile electronic device including: (1) a display panel configured to display image data; (2) an RF transceiver unit configured to perform wireless data communications; (3) a plurality of memory chips configured to store data; and (4) an application processor connected to the display panel, the RF transceiver unit, and the plurality of memory chips. The application processor includes: (a) first and second processors configured to provide an address for using the plurality of memory chips; (b) a first access window configured to set an area, accessed only by the first processor, from among address areas of one or more of the plurality of memory chips; (c) a first linear remapper configured to remap an address received from the first processor and to generate a remapped address; and (d) a memory controller configured to perform a partial linear access operation with respect to the plurality of memory chips, based on the area set by the first access window and the address remapped by the first linear remapper. For each of the memory chips, the first linear remapper remaps consecutively increasing memory addresses of the memory chip to monotonically increasing memory addresses for accessing a first of the memory chips through the partial linear access operation.

Another embodiment of the application is directed to a method of accessing memory chips, the method including: (1) accessing, with a first processor, a first memory area within each of the memory chips through an interleaved access operation; (2) for each of the memory chips, remapping consecutively increasing memory addresses of the memory chip to monotonically increasing memory addresses for accessing a second memory area within a first of the memory chips through a linear access operation; and (3) accessing, solely with a second processor, the second memory area within the first memory chip solely through the linear access operation. The second memory area is the same size or larger than the first memory area.

Another embodiment of the application is directed to a memory system that accesses memory chips, the system including: (1) a first processor that accesses a first memory area within each of the memory chips through an interleaved access operation; (2) a linear remapping component that, for each of the memory chips, remaps consecutively increasing memory addresses of the memory chip to monotonically increasing memory addresses for accessing a second memory area within a first of the memory chips through a linear access operation; and (3) a second processor that solely accesses the second memory area within the first memory chip solely through the linear access operation. The second memory area is the same size or larger than the first memory area.

The system may further include a windowing component that determines whether the memory region to be accessed by the second processor exceeds the size of the second memory area; and a linear remapping component that remaps memory addresses. When the windowing component determines that the memory region to be accessed by the second processor exceeds the size of the second memory area, the linear remapping component: may remap a first range of memory addresses for accessing a fourth memory area within each of the memory chips to a second range of memory addresses used for accessing the second memory area within the first memory chip through the linear access operation, and remap a third range of memory addresses for accessing a fifth memory area within each of the memory chips to a fourth range of memory addresses used for accessing the third memory area within the second memory chip through the linear access operation.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 3 is a table for exemplarily describing an interleaving access method that is based on an address of a memory system shown in FIG. 1;

DETAILED DESCRIPTION

Figure 1:
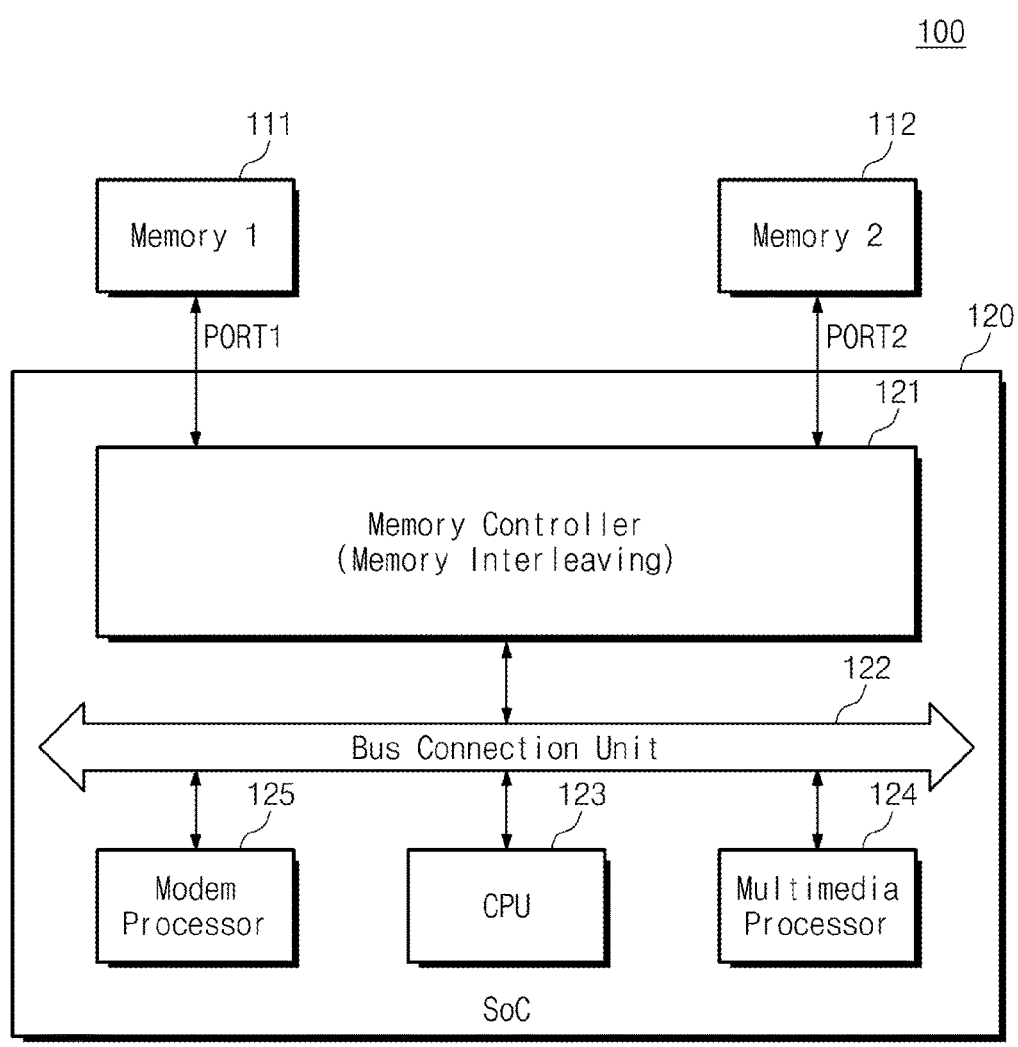
FIG. 1 is a block diagram schematically illustrating a memory system according to an embodiment of the application.

Embodiments will be described in detail with reference to the accompanying drawings. The application, however, may be embodied in various different forms, and should not be construed as being limited only to the illustrated embodiments. Rather, these embodiments are provided as examples so that this disclosure will be thorough and complete, and will fully convey the concept of the application to those skilled in the art. Accordingly, known processes, elements, and techniques are not described with respect to some of the embodiments of the application. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the application.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the application. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this application belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

A memory system according to an embodiment of the application may perform an interleaving access operation where an application processor uses two or more memories (e.g., DRAM) and alternately access ports of the memories.

A memory system according to an embodiment of the application may perform an interleaving access operation where an application processor uses two or more memories (e.g., DRAM) and alternately accesses ports of the memories. In embodiments of the application, the interleaving access operation may be executed with respect to the two or more memories (e.g., DRAM), but a linear access operation may be partially conducted with respect to a specific area of a memory. Below, an interleaving access operation and a partial linear access operation of the memory system according to an embodiment of the application will be more fully described with reference to accompanying drawings.

FIG. 1 is a block diagram schematically illustrating a memory system according to an embodiment of the application. Referring to FIG. 1, a memory system 100 contains a first memory 111, a second memory 112, and an application processor (AP) 120 implemented on a system on chip (SoC).

The application processor 120 contains a memory controller 121 to control the first and second memories 111 and 112, a bus connection unit 122, a central processing unit (CPU) 123, a multimedia processor 124, and a modem processor 125. The memory controller 121 accesses the first memory 111 through a first port PORT1 and accesses the second memory 112 through a second port PORT2. The CPU 123 controls an overall operation of the application processor 120 and controls peripheral devices such as the memories 111 and 112.

The multimedia processor 124 may control multimedia devices such as a camera and a display. To control the multimedia devices, the multimedia processor 124 uses the first and second memories 111 and 112 connected with the application processor 120 in an interleaving access manner. That is, the multimedia processor 124 alternately accesses the first and second memories 111 and 112 through the memory controller 121.

The modem processor 125 implemented on the system on chip (SoC) may be a processor that performs wireless communications with a base station or any other communication devices. The modem processor 125 may access the first memory 111 or the second memory 112 in conjunction with the application processor 120. Like the multimedia processor 124, the modem processor 125 may use the first and second memories 111 and 112 in an interleaving access manner. That is, the modem processor 125 may alternately access the first and second memories 111 and 112 through the memory controller 121.

Figure 2:
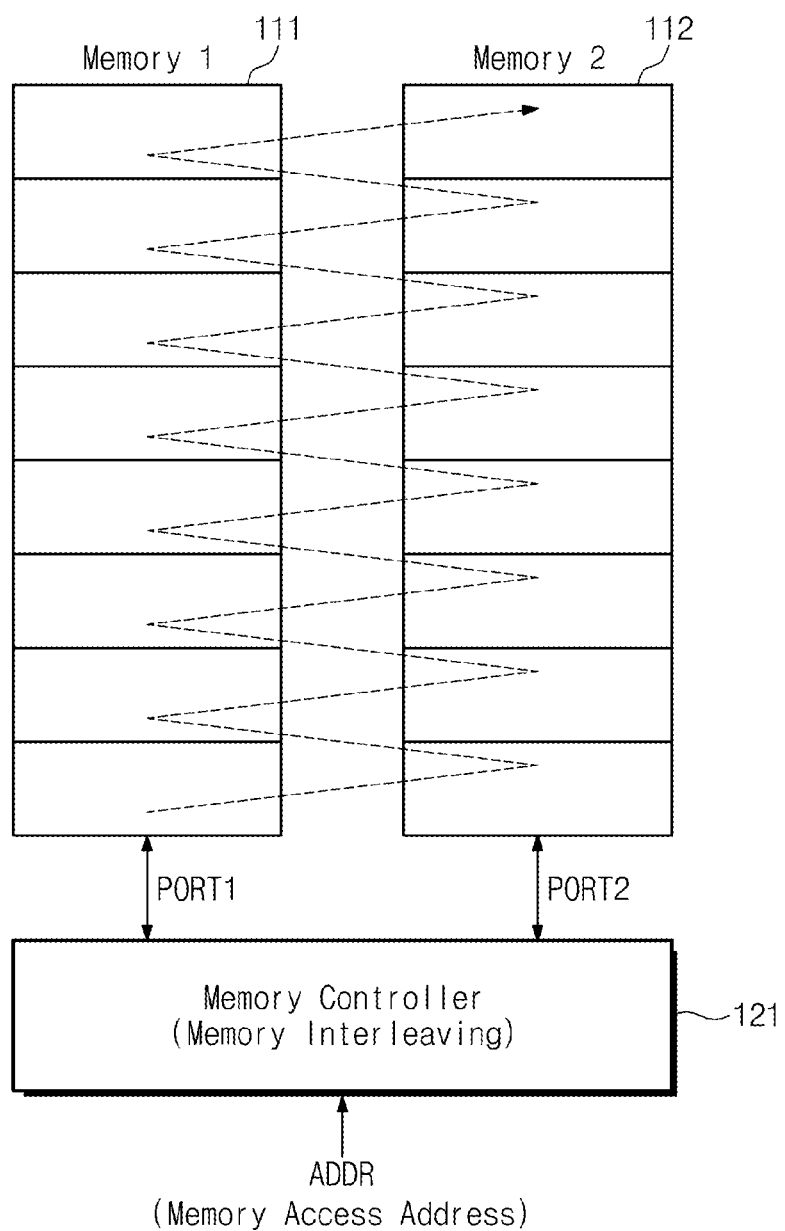
FIG. 2 is a block diagram schematically illustrating an interleaving access operation of a memory system shown in FIG. 1.

FIG. 2 is a block diagram schematically illustrating an interleaving access operation of a memory system shown in FIG. 1. Referring to FIG. 2, a memory controller 121 may receive a memory access address ADDR and performs an interleaving access operation, which is associated with first and second memories 111 and 112, through first and second ports.

The memory controller 121 may write data at the first memory 111 through the first port or may read data from the first memory 111 through the first port. At this time, the first memory 111 may be supplied with power and a clock for memory access. Next, the memory controller 121 may access the second memory through the second port. At this time, the second memory 112 may be supplied with power and a clock for memory access. As described above, the memory controller 121 may perform the interleaving access operation with the first and second memories 111 and 112, based on the memory access address ADDR.

FIG. 3 is a table for exemplarily describing an interleaving access method that is based on an address of a memory system shown in FIG. 1. Referring to FIG. 3, a memory access address ADDR may include chunk bits and an interleaving bit ILB.

In FIG. 3, an embodiment of the application is exemplified as the chunk bits are disposed at a least significant bit (LSB) side and the interleaving bit ILB is disposed following the chunk bits and in a most significant bit (MSB) direction. A memory controller 121 (refer to FIG. 2) may perform an interleaving access operation by the chunk and may determine a first port or a second port based on the interleaving bit ILB. As illustrated in FIG. 3, the first port may be selected when the interleaving bit ILB is "0", and the second port may be selected when the interleaving bit ILB is "1".

In exemplary embodiments, an interleaving unit may vary with the number of chunk bits. For example, assuming that 1-byte data is stored in response to one address, an interleaving access operation may be performed by a 4-byte unit when the number of chunk bits is "2" and may be performed by a 2m-byte unit when the number of chunk bits is "m".

Meanwhile, the number of interleaving bits may vary with the number of memories. One bit may be used as an interleaving bit when the number of memories is "2" as illustrated in FIG. 3, but two bits may be used as interleaving bits when the number of memories is "4". That is, the number of memories may be a maximum of $2^n$ when n interleaving bits are used.

In a memory system 100 shown in FIGS. 1 through 3, a modem processor 125 may perform an interleaving access operation with respect to both a first memory 111 and a second memory 112. That is, the modem processor 125 may perform the interleaving access operation with respect to all memories by alternately accessing the first port and the second port as illustrated in FIG. 2.

The memory system 100 according to an embodiment of the application may support a partial interleaving access operation. That is, the memory system 100 is accessing the first and second memories 111 and 112 in an interleaving manner, and then may perform a linear access operation with respect to the first memory 111 or the second memory 112, and vice versa.

The memory system 100 according to an embodiment of the application may perform the partial interleaving access operation in various manners. Below, a method for performing the partial interleaving access operation without changing of a memory controller will be more fully described.

Figure 4:
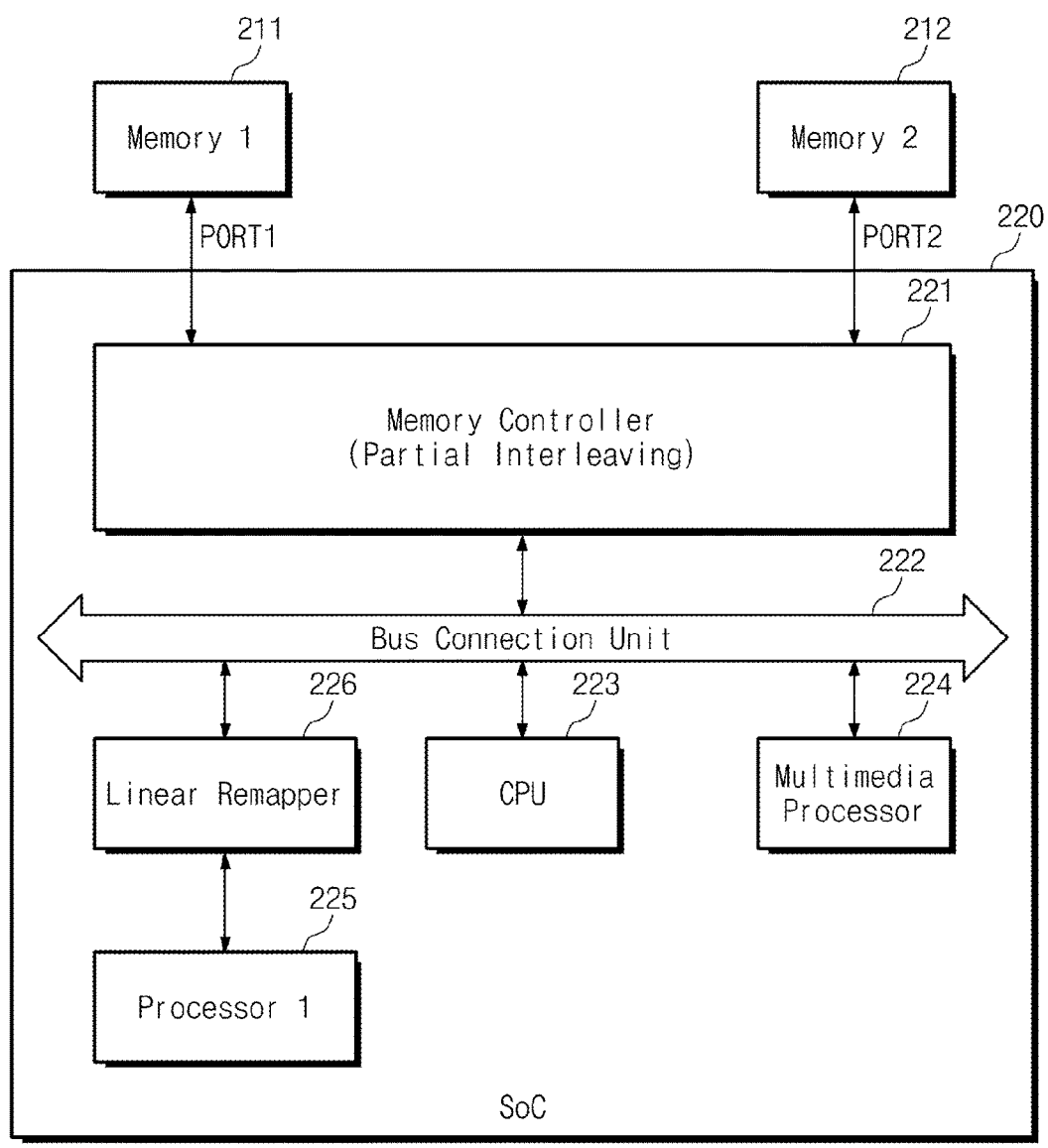
FIG. 4 is a block diagram schematically illustrating a memory system to perform a partial interleaving access operation, according to an embodiment of the application.

FIG. 4 is a block diagram schematically illustrating a memory system to perform a partial interleaving access operation, according to an embodiment of the application. Referring to FIG. 4, a memory system 200 may contain a first memory 211, a second memory 212, and an application processor 220 implemented on a system on chip.

The application processor 220 may include a memory controller 221, a bus connection unit 222, a central processing unit 223, a multimedia processor 224, a first processor 225, and a linear remapper 226. The memory controller 221 may access the first memory 221 through a first port PORT1 and the second memory 212 through a second port PORT2.

In the memory system 200 shown in FIG. 4, the linear remapper 226 is connected to the first processor 225, thereby making it possible to perform a linear access operation with respect to a specific area of the first and second memories 211 and 212. In exemplary embodiments, a partial linear access operation may be performed without changing of the memory controller 221 by simply connecting the linear remapper 226 to the first processor 225. In FIG. 4, the first processor 225 may be a modem processor shown in FIG. 1.

Figure 5:
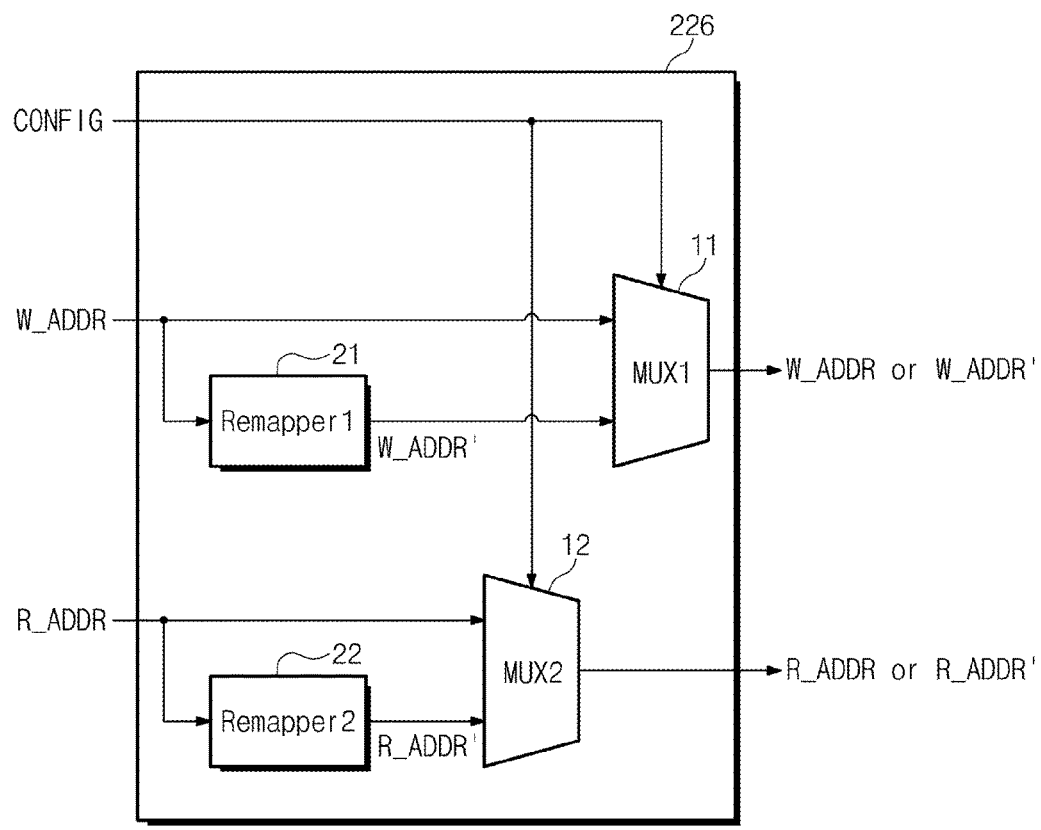
FIG. 5 is a block diagram schematically illustrating a linear remapper shown in FIG. 4.

FIG. 5 is a block diagram schematically illustrating a linear remapper shown in FIG. 4. Referring to FIG. 5, a linear remapper 226 may contain a first selector (or, multiplexer) (MUX1) 11, a second selector (or, multiplexer) (MUX2) 12, a first remapper 21, and a second remapper 22. In exemplary embodiments, the first selector 11 and the first remapper 21 may be used upon receiving a write address W_ADDR, and the second selector 12 and the second remapper 22 may be used upon receiving a read address R_ADDR.

The linear remapper 226 may receive a selection signal CONFIG from a central processing unit 223 (refer to FIG. 4) and may select an interleaving access operation or a partial linear access operation. For example, when the selection signal CONFIG has a value of "0", an address W_ADDR or R_ADDR received from a first processor 225 may be transferred to a memory controller 221 (refer to FIG. 4). When the selection signal CONFIG has a value of "1", an address W_ADDR' or R_ADDR' that the first remapper 21 or the second remapper 22 remaps may be provided to the memory controller 221. Below, an embodiment where the linear remapper 226 selects a partial linear access operation will be described.

Figure 6:
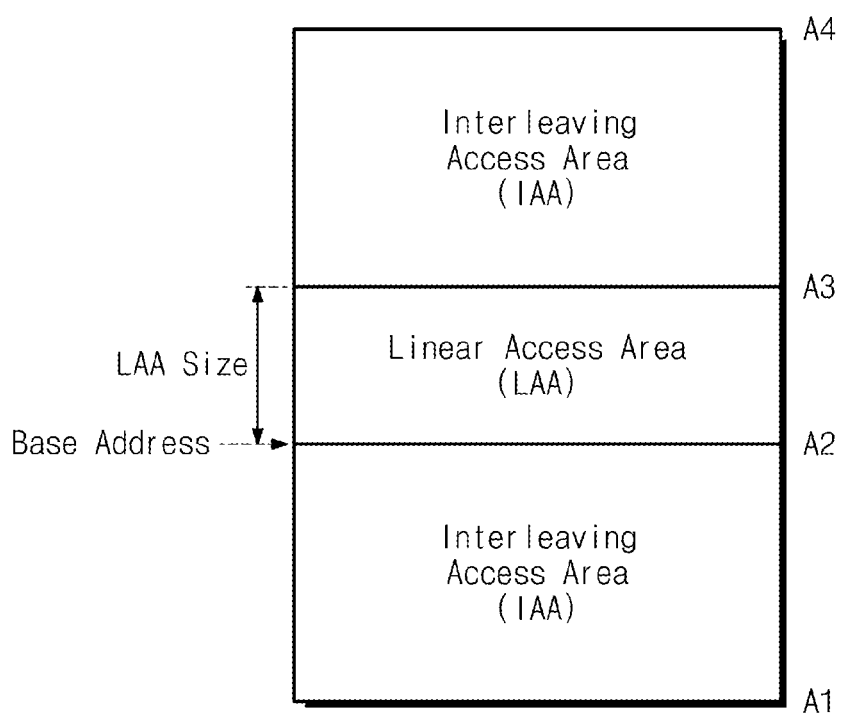
FIG. 6 is a conceptual diagram showing an operating address of a linear remapper shown in FIG. 4.

FIG. 6 is a conceptual diagram showing an operating address of a linear remapper shown in FIG. 4. Referring to FIG. 6, a memory access address may be divided into an area IAA (hereinafter referred to as "interleaving access area") where an interleaving access operation is performed and an area LAA (hereinafter referred to as "linear access area") where a linear access operation is performed.

In FIG. 6, an interleaving access operation may be performed at the interleaving access areas that are defined by addresses A1 and A2 and A3 and A4, and a linear access operation may be performed at the linear access area that is defined by addresses A3 and A4. In exemplary embodiments, a linear remapper 226 (refer to FIG. 4) may operate in an address range from A2 to A3. The address A2 may be an LAA base address, and the address A3 may be (LAA base address+LAA size−1). The linear remapper 226 may receive the LAA base address and the LAA size through a CONFIG signal (refer to FIG. 5) as a setting value, thereby making it possible to operate at the linear access area LAA.

Figure 7:
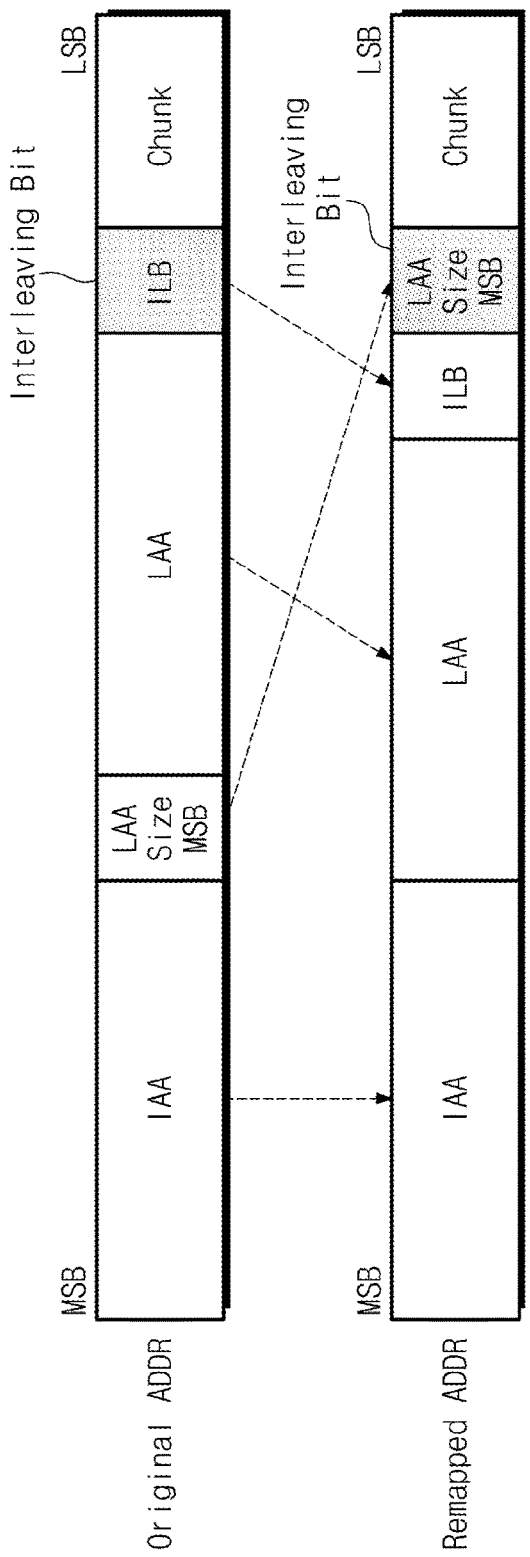
FIG. 7 is a diagram schematically illustrating an address remapping method of a linear remapper shown in FIGS. 4 and 5.

FIG. 7 is a diagram schematically illustrating an address remapping method of a linear remapper shown in FIGS. 4 and 5. In FIG. 7, an address Original ADDR may be an address W_ADDR or R_ADDR received from a first processor 225 (refer to FIG. 4), and an address Remapped ADDR may be an address W_ADDR' or R_ADDR' that a linear remapper 226 remaps.

Referring to FIG. 7, a memory access address ADDR may contain chunk bits and an interleaving bit ILB. The chunk bits may form a unit where an interleaving access operation is performed, and the interleaving bit ILB may be a bit for determining a first port or a second port. An LAA bit and an IAA bit may denote address ranges where a linear access operation and an interleaving access operation are respectively performed.

The linear remapper 226 may perform a remapping operation, for example, using "LAA size MSB". Assuming that the LAA size is 64 MB, a bit corresponding to log $2^{(LAA\ size)}$, that is, a $26^{th}$ bit (=log $2^{226}$) shifts into an interleaving bit, and remaining bits shift in an MSB direction.

The above-described process may enable an interleaving bit corresponding to a linear access area to have the same value (0 or 1); hence, a linear access operation may be performed. An embodiment of the application is exemplified as the linear remapper 226 uses "LAA size MSB". However, the scope and spirit of the application may not be limited thereto. For example, a remapping operation may be carried out through any other methods.

Figure 8:
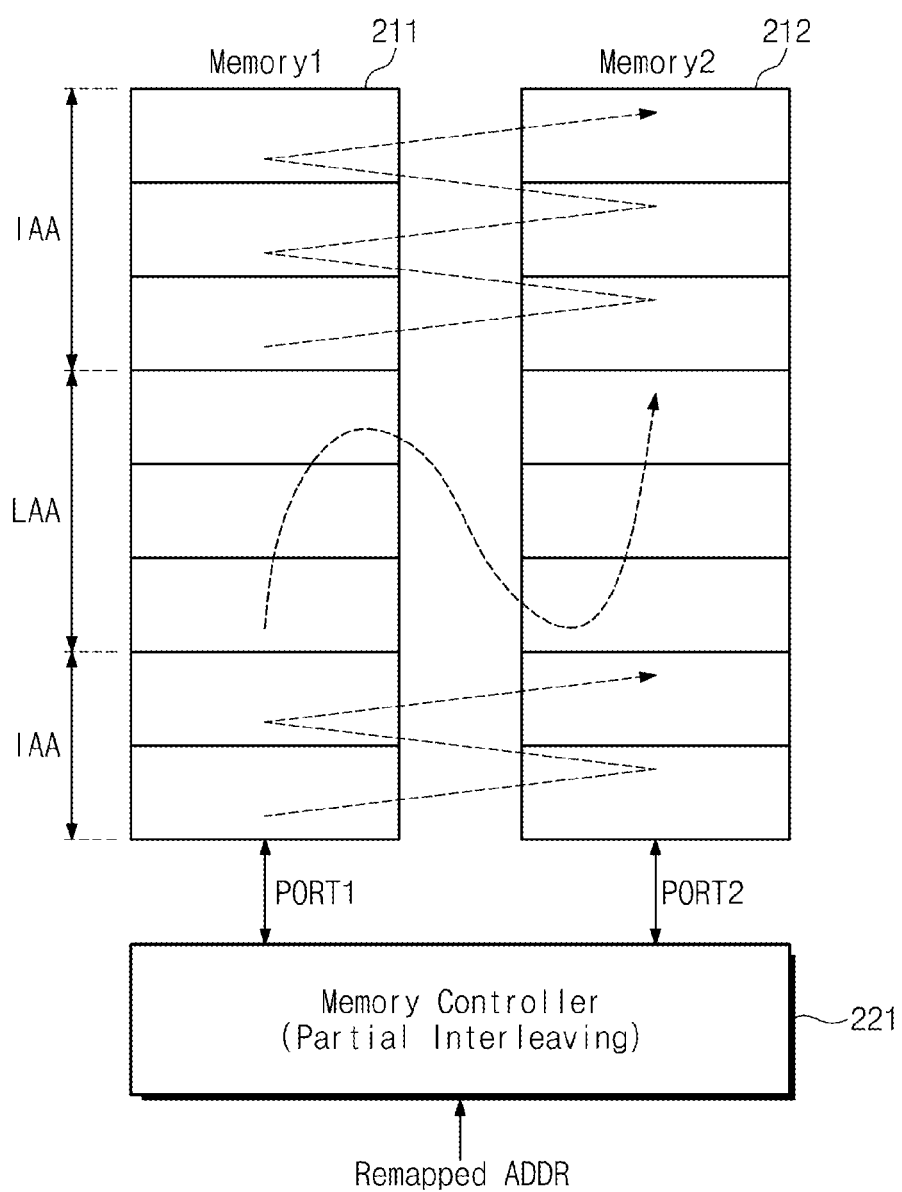
FIG. 8 is a block diagram schematically illustrating a partial linear access operation of a memory system shown in FIG. 4.

FIG. 8 is a block diagram schematically illustrating a partial linear access operation of a memory system shown in FIG. 4. Referring to FIG. 8, a memory controller 221 may receive a remapped address Remapped ADDR and may perform a partial linear access operation about first and second memories 211 and 212 through first and second ports.

In an interleaving access area IAA, first, the memory controller 221 may perform an interleaving access operation with respect to the first and second memories 211 and 212 by alternately accessing the first and second ports. Next, in a linear access area LAA, the memory controller 221 may perform a linear access operation with respect to the first memory 211 through the first port. After the linear access operation associated with the first memory 211 is completed, the memory controller 221 may perform the linear access operation with respect to the second memory 212 through the second port. Then, in an interleaving access area IAA, the memory controller 221 may perform the interleaving access operation with respect to the first and second memories 211 and 212 by alternately accessing the first and second ports.

Figure 9:
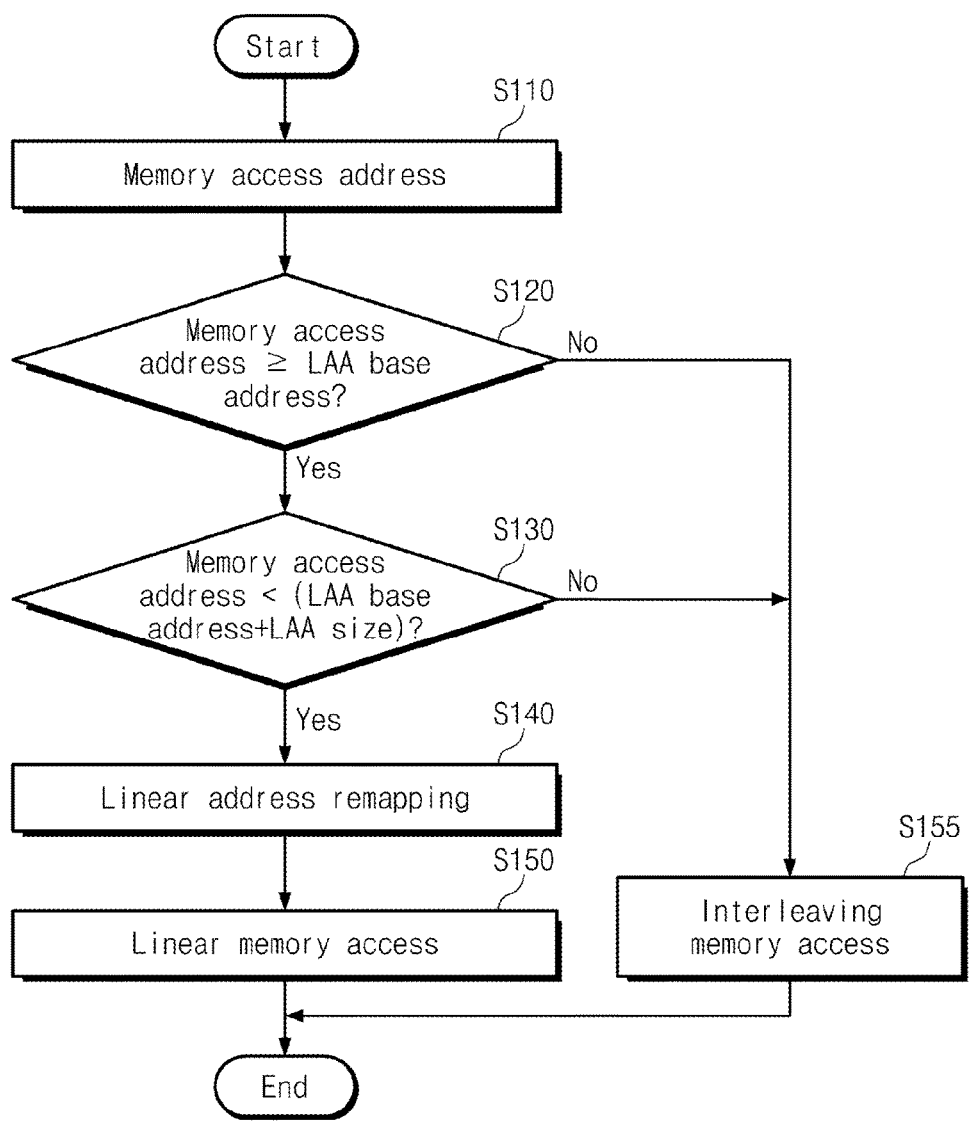
FIG. 9 is a flow chart for describing a partial linear access operation of a memory system shown in FIG. 4.

FIG. 9 is a flow chart for describing a partial linear access operation of a memory system shown in FIG. 4. Below, a partial linear access operation of a memory system will be more fully described with reference to FIGS. 4 through 9.

In step S110, a memory access address ADDR is received. A linear remapper 226 (refer to FIG. 4) may have a base address and the size of a linear access area LAA. The linear remapper 226 may determine whether the input memory access address ADDR belongs to an interleaving access area IAA or to a linear access area LAA, based on the LAA base address and LAA size.

In step S120, the linear remapper 226 may determine whether a value of the memory access address ADDR is greater than or equal to a value of the LAA base address. When a value of the memory access address ADDR is smaller than a value of the LAA base address, in step S155, an interleaving access operation may be performed. When a value of the memory access address ADDR is greater than or equal to a value of the LAA base address, the method may proceed to step S130.

In step S130, the linear remapper 226 may determine whether a value of the memory access address ADDR is smaller than a value of (LAA base address+LAA size). When a value of the memory access address ADDR is not smaller than a value of (LAA base address+LAA size), in step S155, the interleaving access operation may be performed. When a value of the memory access address ADDR is smaller than a value of (LAA base address+LAA size), the method may proceed to step S140.

In step S140, the linear remapper 226 may perform linear address remapping. The linear address remapping may be accomplished by shifting "LAA size MSB" into an interleaving bit and remaining upper bits in an MSB direction as illustrated in FIG. 7.

In step S150, a memory controller 221 (refer to FIG. 7) may receive a remapped address Remapped ADDR and may perform a linear access operation within a first memory 211 or a second memory 212 in a linear access area LAA.

In steps S120 and S130, a memory system 200 according to an embodiment of the application may determine whether a memory access address ADDR belongs to a linear access area LAA. As illustrated in FIG. 6, the interleaving access operation may be performed when the memory access address ADDR belongs to an interleaving access area IAA ranging from A1 to A2 or from A3 to A4. The linear access operation may be performed when the memory access address ADDR belongs to a linear access area LAA ranging from A2 to A3.

Meanwhile, a memory system according to an embodiment of the application may be applied to the event that two or more linear access areas LAA exist.

Figure 10:
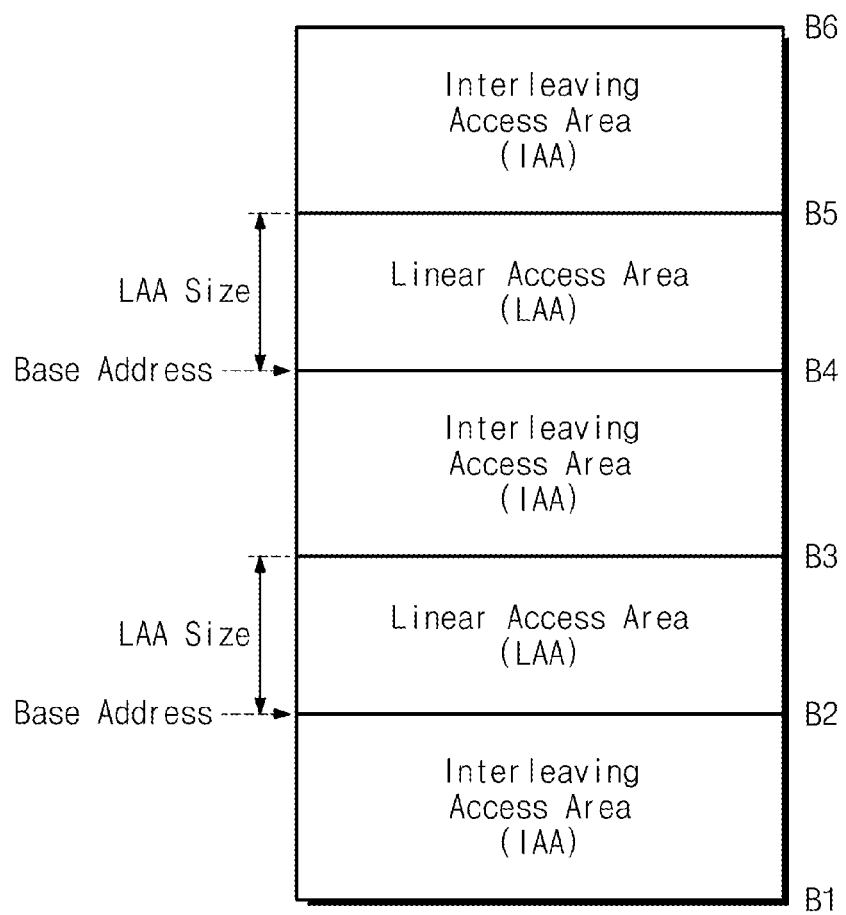
FIG. 10 is a conceptual diagram showing an embodiment where two or more linear access areas (LAA) exist.

FIG. 10 is a conceptual diagram showing an embodiment where two or more linear access areas LAA exist.

In FIG. 10, an interleaving access operation may be performed at areas that range from B1 to B2, from B3 to B4, and B5 to B6, and a linear access operation may be performed at areas that range from B2 to B3 and from B4 to B5. Areas where a linear remapper 226 (refer to FIG. 4) may operate range from B2 to B3 and from B4 to B5 as illustrated in FIG. 10. In FIG. 10, each of addresses B2 and B4 may be an LAA base address, and each of addresses B3 and B5 may be (LAA base address+LAA size−1). The linear remapper 226 may receive the LAA base address and LAA size as a setting value, thereby making it possible to operate at a linear access area LAA.

Returning to FIG. 4, as the linear remapper 226 is connected to a first processor 225, so it is connected to a central processing unit 223 or a multimedia processor 224. Also, the linear remapper 226 may be connected to share processors such as the first processor 225, the central processing unit 223, and the multimedia processor 224.

Figure 11:
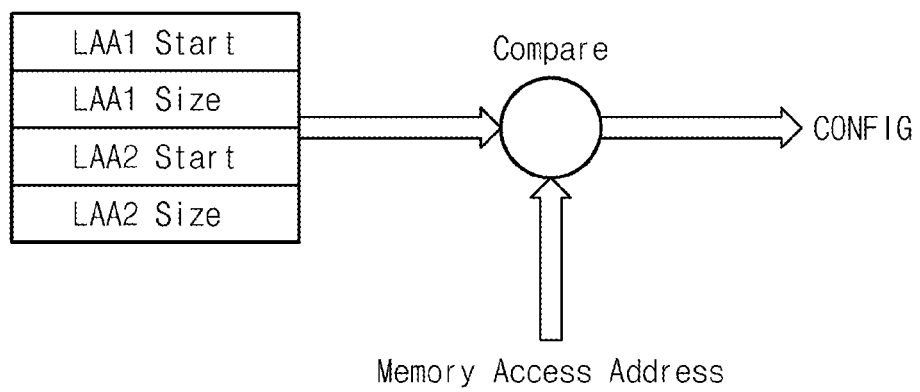
FIG. 11 is a diagram for describing how to generate a CONFIG signal for controlling a remapping signal through the setting of a special function register (SFR)

FIG. 11 is a diagram for describing how to generate a CONFIG signal for controlling a remapping signal through the setting of a special function register (SFR). In FIG. 11, "LAA1 Start" may indicate a start address of a first area necessitating linear access, and "LAA1 Size" may indicate the size of a linear access area LAA1. "LAA2 Start" may indicate a start address of a second area necessitating linear access, and "LAA2 Size" may indicate the size of a linear access area LAA2. A special function register (SFR) may be set by a central processing unit. A signal CONFIG may be generated by comparing a value of the special function register with a value of a memory access address. For example, the signal CONFIG may be activated when the memory access address belongs to LAA1 or LAA2, thereby making it possible to select a remapping address.

A memory system according to an embodiment of the application may be applied when a modem chip is placed outside a system on chip (SoC). On this occasion, the modem chip and the system on chip may be connected through a chip to chip (C2C) interface.

Figure 12:
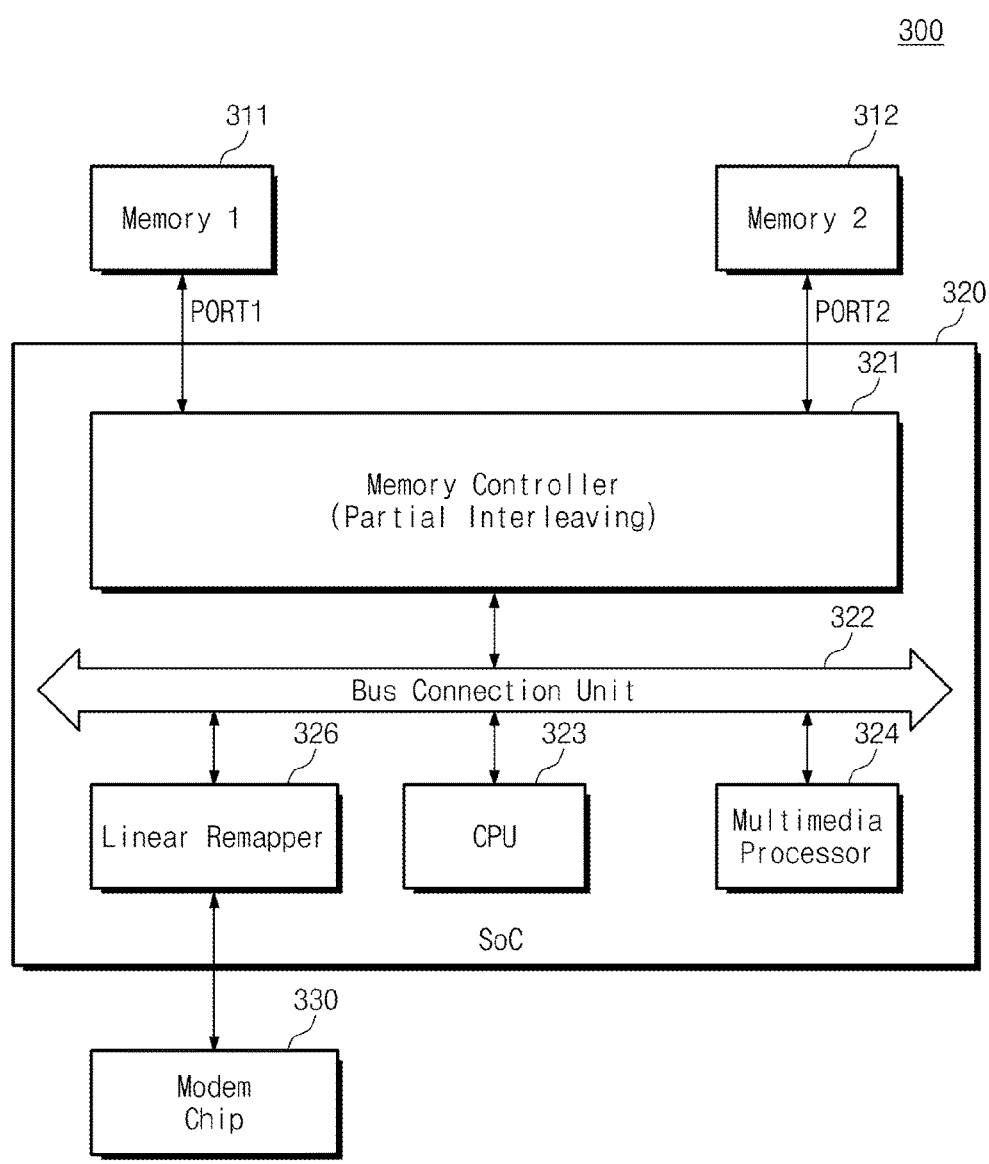
FIG. 12 is a block diagram schematically illustrating a memory system where a modem chip is disposed outside a system on chip.

FIG. 12 is a block diagram schematically illustrating a memory system where a modem chip is disposed outside a system on chip. Referring to FIG. 12, a memory system 300 may contain a first memory 311, a second memory 312, an application processor 320 implemented on a system on chip (SoC), and a modem chip 330.

The application processor 320 may contain a memory controller 321, a bus connection unit 322, a central processing unit 323, a multimedia processor 324, and a linear remapper 326. The memory controller 321 accesses the first memory 311 through a first port PORT1 and the second memory 312 through a second port PORT2.

In the memory system 300 shown in FIG. 12, the linear remapper 326 is connected to the modem chip 330, thereby making it possible to perform a linear access operation at a specific area of the first and second memories 311 and 312. Because the linear remapper 326 is simply added, it is possible to perform a partial linear access operation without changing the memory controller 321. In other exemplary embodiments, the linear remapper 326 may be placed between the bus connection unit 322 and the memory controller 321.

As described above, a memory system according to an embodiment of the application may perform a linear access operation or a partial linear access operation with respect to two or more memories. Bandwidth balance between two or more memories may be adjusted through the interleaving access operation, thereby making effective use possible.

Meanwhile, in embodiments of the application, a linear access operation may be performed when a model is used, for example, when it is unnecessary to perform an interleaving access operation with respect to two memories. In particular, a memory access scheme according to an embodiment of the application may be efficiently used in a mobile system that requires less power consumption. In exemplary embodiments, as a partial linear access operation is performed in a memory system that uses the interleaving access operation, one memory may be used, or memory bandwidth may be focused on one memory intentionally.

With the above description, clock gating or power gating of any other memory remaining at an idle state may be possible, or setting of the memory, remaining at the idle state, to a self-refresh mode may be possible. Thus, power consumption may be reduced. If an interleaving access operation is performed with respect to all memories, power consumption may increase because the power and clock continue to be supplied to all memories.

In embodiments of the application, power consumption of a memory system that uses the interleaving access operation may be reduced by adding a linear remapper in front of a specific processor (e.g., modem) and performing a partial linear access operation.

Figure 13:
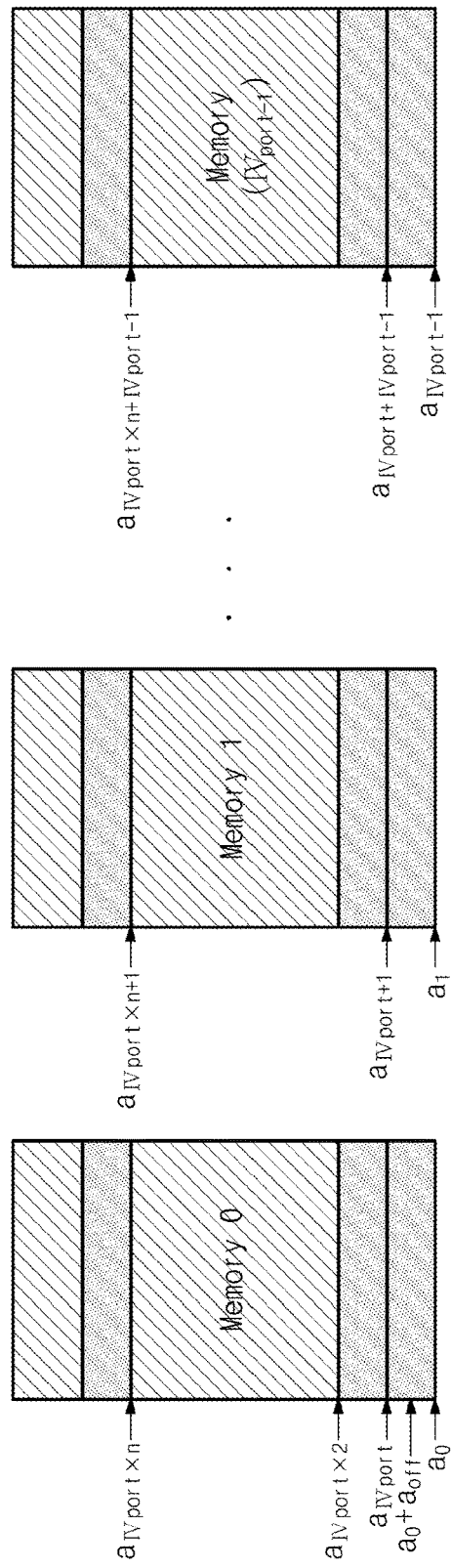
FIG. 13 is a diagram for expressing a linear access operation of a memory system including two or more memories, using equations.

FIG. 13 is a diagram for expressing a linear access operation of a memory system including two or more memories, using equations.

In FIG. 13, "an" may indicate a start address of an n-th chunk, "IVsize" may indicate a chunk size, and "IVport" may indicate the number of memory ports. A memory access address "a" may be divided into an n-th base address "an" and an offset address "aoff" at a linear area and may be expressed by the following equation 1.

$$a = a_n + a_{off} \quad (1)$$

Here, since the chunk size is "IVsize", $0 \leq a_{off} < IVsize$. In equation 1, "an" may indicate a value of an address area that increases from a base address a0 of a first chunk as many as the number of chunks and may be expressed by the following equation (2).

$$a_n = a_0 + IVsiz \times n \quad (2)$$

Here, n=(an−a0)/IVsize.

At this time, a chunk may be selected in the light of interleaving. When a memory chunk of an r-th port of one or more memory ports is selected and a k-th memory chunk from the lowermost at each memory port is selected, "an" may be expressed by the following equations (3) and (4) on the basis of an r value for selecting a row and a k value for selecting a column.

$$\begin{aligned} a_n = a_{(r,k)} &= a_{IVport \times k + r} \quad (3) \\ &= a_0 + IVsize \times (IVport \times k + r) \\ &= a_0 + IVsize \times IVport \times \frac{a_n - a_0}{IVsize} + IVsize \times r \end{aligned}$$

Here, "r" may be greater than or equal to "0" and may be smaller than "IVport".

$$a_n = IVport \times a_n - (IVport - 1) \times a_0 + IVsize \times r \quad (4)$$

Thus, as described with reference to FIGS. 7 and 8, a chunk bit described with reference to FIG. 7 may correspond to "aoff", and an interleaving bit ILB of an original address may correspond to an r value for selecting a memory port (refer to equation (3)), and each of an IAA bit and an LAA bit may correspond to a k value. An address for accessing each memory port may be generated using a bit of the original address. As described with reference to FIG. 7, a partial linear access operation may be possible by manipulating (e.g., shifting) the LAA bit and the ILB bit.

Figure 14:
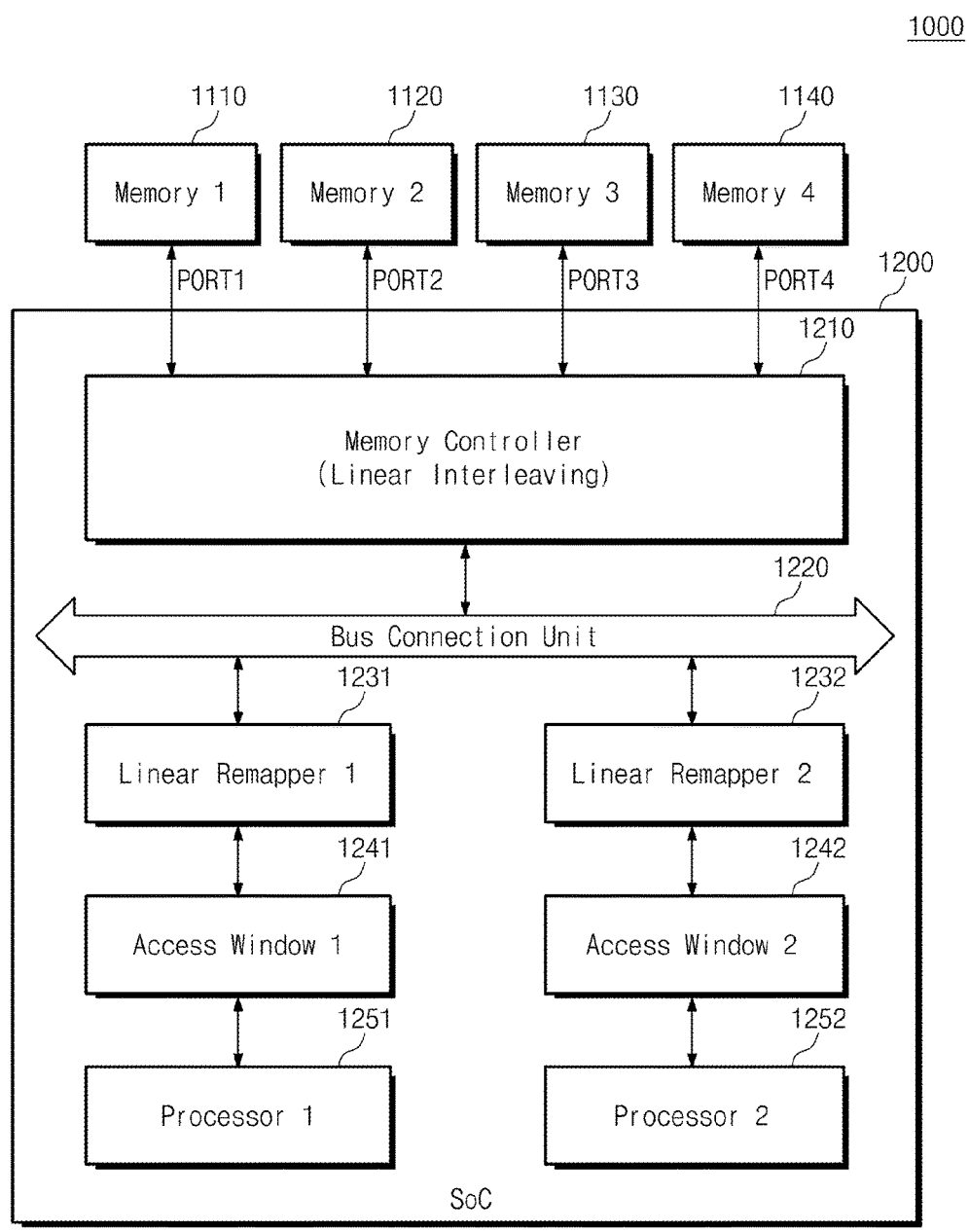
FIG. 14 is a block diagram schematically illustrating a memory system to perform an asymmetric linear access operation, according to another embodiment of the application.

FIG. 14 is a block diagram schematically illustrating a memory system to perform an asymmetric linear access operation, according to another embodiment of the application. Referring to FIG. 14, a memory system 1000 may contain first through fourth memories 1110 through 1140 and an application processor 1200 implemented on a system on chip.

The application processor 1200 may include a memory controller 1210, a bus connection unit 1220, first and second linear remappers 1231 and 1232, and first and second processors 1251 and 1252. The memory controller 1210 may access the first through fourth memories 1110 through 1140 through first through fourth ports.

In the memory system 1000 shown in FIG. 14, the first and second linear remappers 1231 and 1232 may be connected to the first and second processors 1251 and 1252, respectively, thereby making it possible to perform a linear access operation at a specific address area of the first through fourth memories 1110 through 1140.

In the memory system 1000, the first and second processors 1251 and 1252 may be respectively connected to first and second access windows 1241 and 1242, thereby making it possible for a specific processor to perform a linear access operation at a specific memory of the first through fourth memories 1110 through 1140. For example, a linear access operation of the first processor 1251 may be only performed at a linear access area LAA, and a linear access operation of the second processor 1252 may be performed at linear access areas of the second through fourth memories 1120 through 1140.

Since a linear remapper and an access window are assigned to each processor, the memory system 1000 shown in FIG. 14 may perform an asymmetric linear access operation. That is, in embodiments of the application, an area where a linear access operation is performed may be independently set to each processor, thereby making it possible to perform the asymmetric linear access operation.

Figure 15:
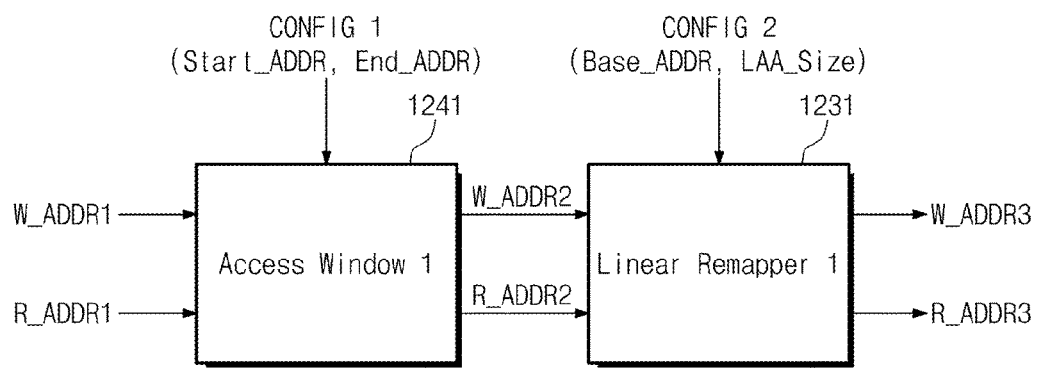
FIG. 15 is a block diagram schematically illustrating a linear remapper and an access window shown in FIG. 14.

FIG. 15 is a block diagram schematically illustrating a linear remapper and an access window shown in FIG. 14. Referring to FIG. 15, a first access window 1241 may receive a first CONFIG signal from a special function register (SFR) (refer to FIG. 11). The first access window 1241 may set an independent access area that a first processor 1251 (refer to FIG. 14) only accesses or may block the first processor 1251 from accessing a specific access area. Here, it is possible to provide the first CONFIG signal through a ROM or CPU.

The first access window 1241 may set a specific address area, of one or more memories of the first through fourth memories 1110 through 1140, to an independent access area. For example, the first access window 1241 may set a specific address area of the first memory 1110 to an independent access area. The first CONFIG signal may include start and end addresses of the independent access area. In this scenario, it is not allowed for the second processor 1252 to access the independent access area of the first memory 1110.

Likewise, a second window 1242 (refer to FIG. 14) may set a specific address area of one or more memories of the second through fourth memories 1120 through 1140 to an independent access area. In this scenario, it is not allowed for the first processor 1251 to access the independent access area thus set.

A first linear remapper 1231 may have an internal configuration and an operation principle described with reference to FIG. 5. That is, the first linear remapper 1231 may select an interleaving access operation or a linear access operation based on a second CONFIG signal from the special function register. The first linear remapper 1231 may provide a memory controller 1210 with a remapped address W_ADDR3 or R_ADDR3 of an internal remapper 21 or 22 (refer to FIG. 5), based on the second CONFIG signal.

Figure 16:
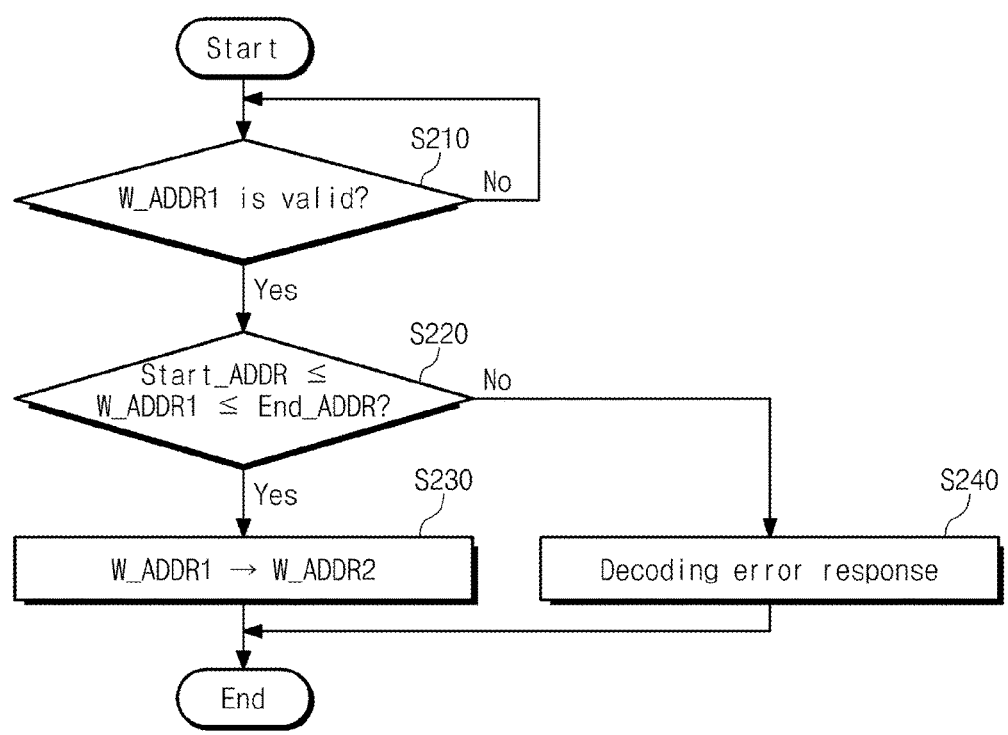
FIGS. 16 and 17 are flow charts for describing an operation of an access window shown in FIG. 15.
Figure 17:
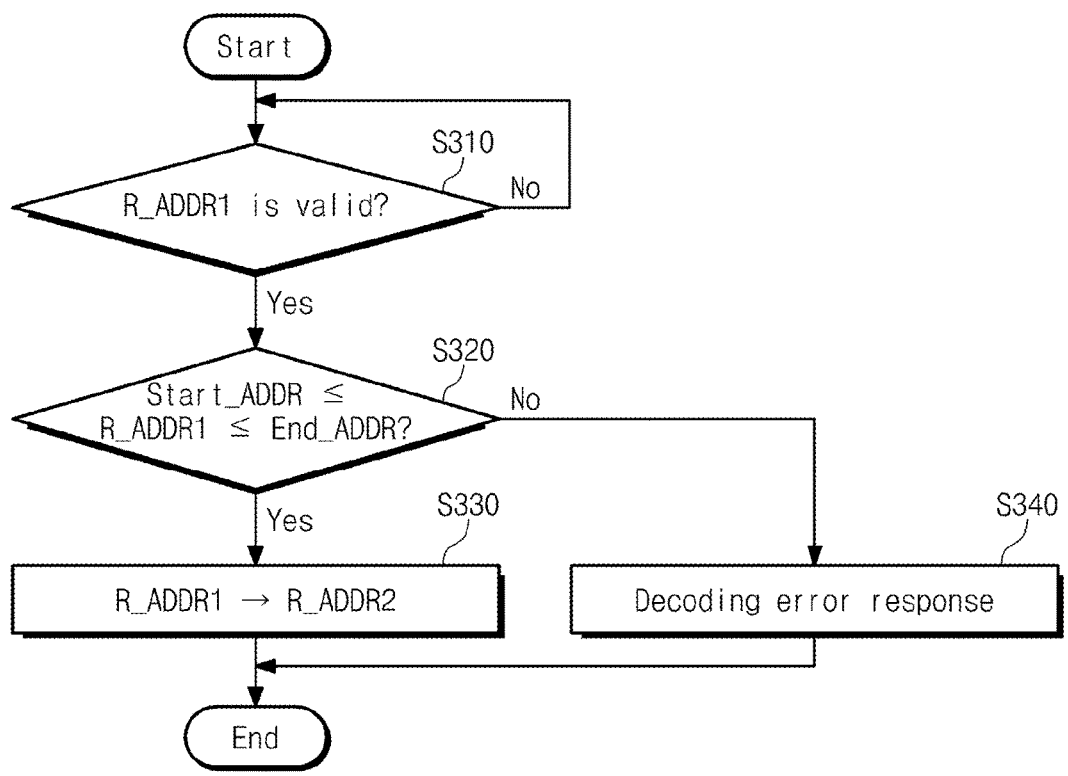

FIGS. 16 and 17 are flow charts for describing an operation of an access window shown in FIG. 15. FIG. 16 is a flow chart showing a write operation, and FIG. 17 is a flow chart showing a read operation.

Referring to FIG. 16, in step S210, whether an input write address W_ADDR1 is valid may be determined. As a consequence of determining that the write address W_ADDR1 is invalid, the method proceeds to step S210. As a consequence of determining that the write address W_ADDR1 is valid, the method proceeds to step S220. In step S220, whether the write address W_ADDR1 belongs to a range of a specific access area provided from a special function register SFR may be determined. That is, there may be determined whether the write address W_ADDR1 exists between a start address Start_ADDR and an end address End_ADDR of the specific access area. Here, the specific access area may mean an area that a first processor 1251 (refer to FIG. 14) only accesses.

When the write address W_ADDR1 belongs to a range of the specific access area, in step S230, a first access window 1241 may provide W_ADDR2 to a linear remapper 1231. When the write address W_ADDR1 does not belong to a range of the specific access area, in step S240, a decoding error response may be issued.

Referring to FIG. 17, in step S310, whether an input read address R_ADDR1 is valid may be determined. As a consequence of determining that the read address R_ADDR1 is valid, the method proceeds to step S320. In step S320, whether the read address R_ADDR1 exists between a start address Start_ADDR and an end address End_ADDR of a specific access area. When the read address R_ADDR1 belongs to a range of the specific access area, in step S330, the first access window 1241 may provide R_ADDR2 to the linear remapper 1231. When the read address R_ADDR1 does not belong to a range of the specific access area, in step S340, a decoding error response may be issued.

Figure 18:
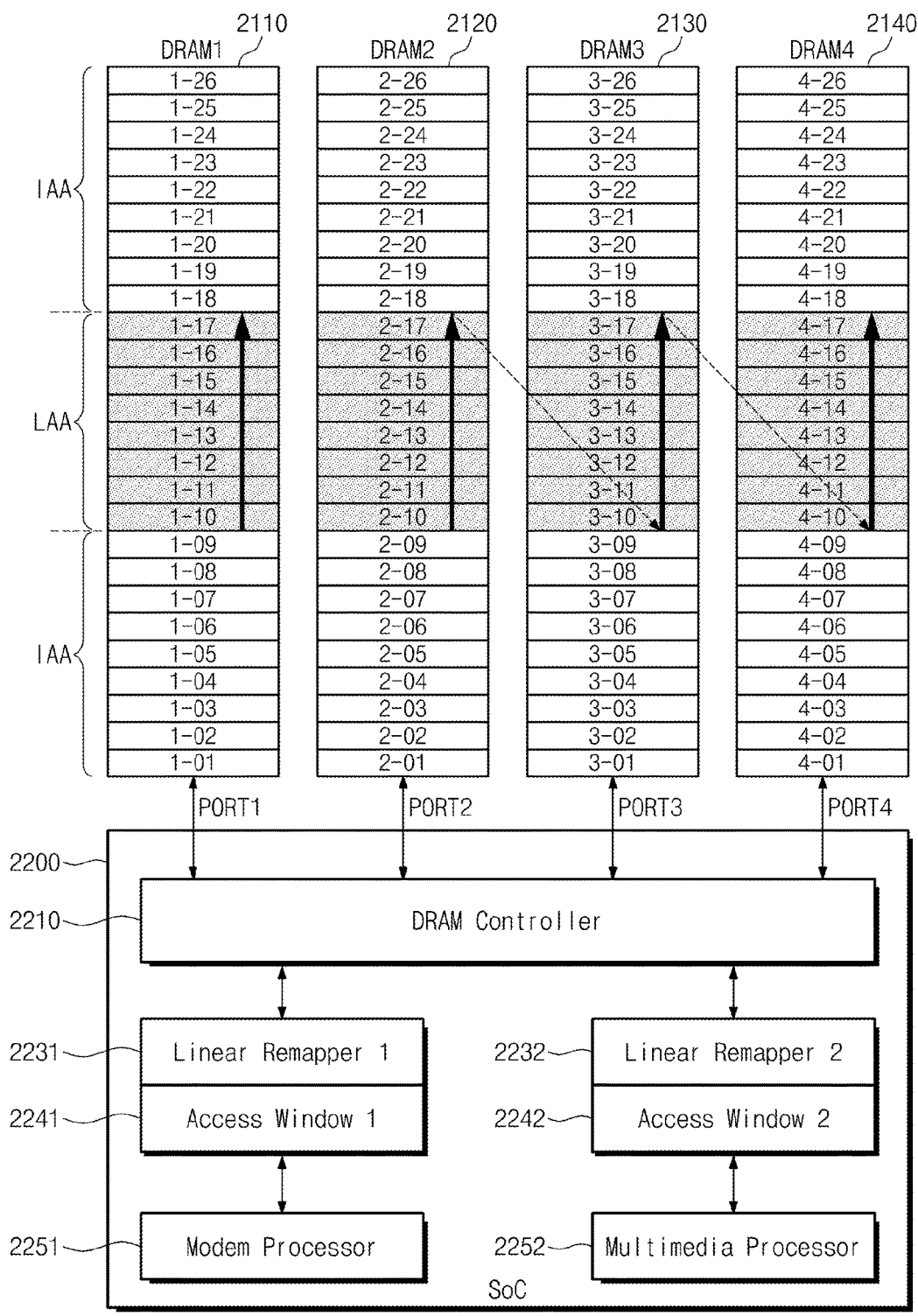
FIG. 18 is a block diagram schematically illustrating a memory system to perform an asymmetric linear access operation, according to still another embodiment of the application.

FIG. 18 is a block diagram schematically illustrating a memory system to perform an asymmetric linear access operation, according to still another embodiment of the application. Referring to FIG. 18, a memory system 2000 may contain first through fourth DRAMs 2110 through 2140 and an application processor 2200 implemented on a system on chip.

The application processor 2200 may include a DRAM controller 2210, first and second linear remappers 2231 and 2232, first and second access windows 2241 and 2242, a modem processor 2251, and a multimedia processor 2252. The DRAM controller 2210 may access the first through fourth DRAMs 2110 through 2140 through first through fourth ports PORT1 through PORT4.

The first DRAM 2110 may have a plurality of address areas 1-01 through 1-26. The $1^{st}$ through $9^{th}$ address areas 1-01 through 1-09 and the $18^{th}$ through $26^{th}$ address areas 1-18 through 1-26 may constitute an interleaving access area IAA, and the $10^{th}$ through $17^{th}$ address areas 1-10 through 1-17 may constitute a linear access area LAA. Likewise, each of the second through fourth DRAMs 2120 and 2140 may have an interleaving access area IAA and a linear access area LAA.

As shown in FIG. 18, the $10^{th}$ through $17^{th}$ address areas of each of the first through fourth DRAMs 2110 through 2140 may be set to a linear access area LAA (marked by gray). The first access window 2241 and the first linear remapper 2231 are connected to the modem processor 2251, thereby making it possible to perform a linear access operation at a specific address area (e.g., 1-10 through 1-17) of the first through fourth DRAMs 2110 through 2140. A linear access area LAA of the first DRAM 2110 may be an area that the modem processor 2251 only accesses.

For example, assuming that a modem code is stored at the linear access area LAA of the first DRAM 2110 through a partial linear access operation, the multimedia processor 2252 may not access the linear access area LAA of the first DRAM 2110, and the modem processor 2251 may only access the linear access area LAA of the first DRAM 2110. Similarly, the modem processor 2251 may be excluded from using linear access areas LAA of the second through fourth DRAMs 2120 through 2140.

In the memory system 2000 according to an embodiment of the application, the second access window 2242 and the second linear remapper 2232 may be connected to the multimedia processor 2252, thereby making it possible to use linear access areas LAA of the second through fourth DRAMs 2120 through 2140. That is, the memory system 2000 may perform a partial linear access operation with respect to the linear access areas LAA of the second through fourth DRAMs 2120 through 2140. The linear access areas LAA of the second through fourth DRAMs 2120 through 2140 may be set to an area that the multimedia processor 2252 only accesses.

The multimedia processor 2252 may enable the partial linear access operation to be performed at the linear access areas LAA of the second through fourth DRAMs 2120 through 2140, using the second access window 2242 and the second linear remapper 2232. First, the linear access operation may be performed with respect to the $10^{th}$ through $17^{th}$ address areas 2-10 through 2-17 of the second DRAM 2120. Next, the linear access operation may be performed with respect to the $10^{th}$ through $17^{th}$ address areas 3-10 through 3-17 of the third DRAM 2130. Finally, the linear access operation may be performed with respect to the $10^{th}$ through $17^{th}$ address areas 4-10 through 4-17 of the fourth DRAM 2140.

Figure 19:
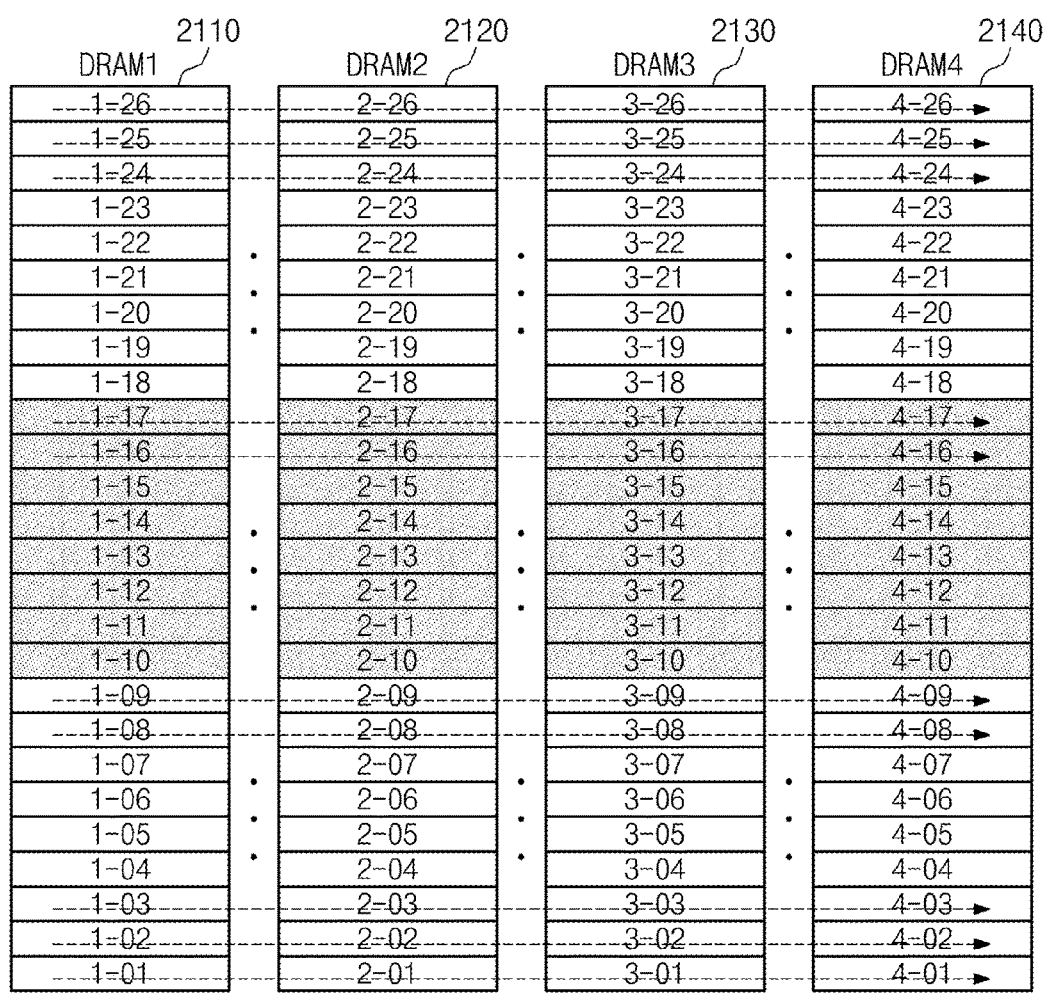
FIGS. 19 and 20 are block diagrams schematically illustrating an address area of a memory system shown in FIG. 18.
Figure 20:
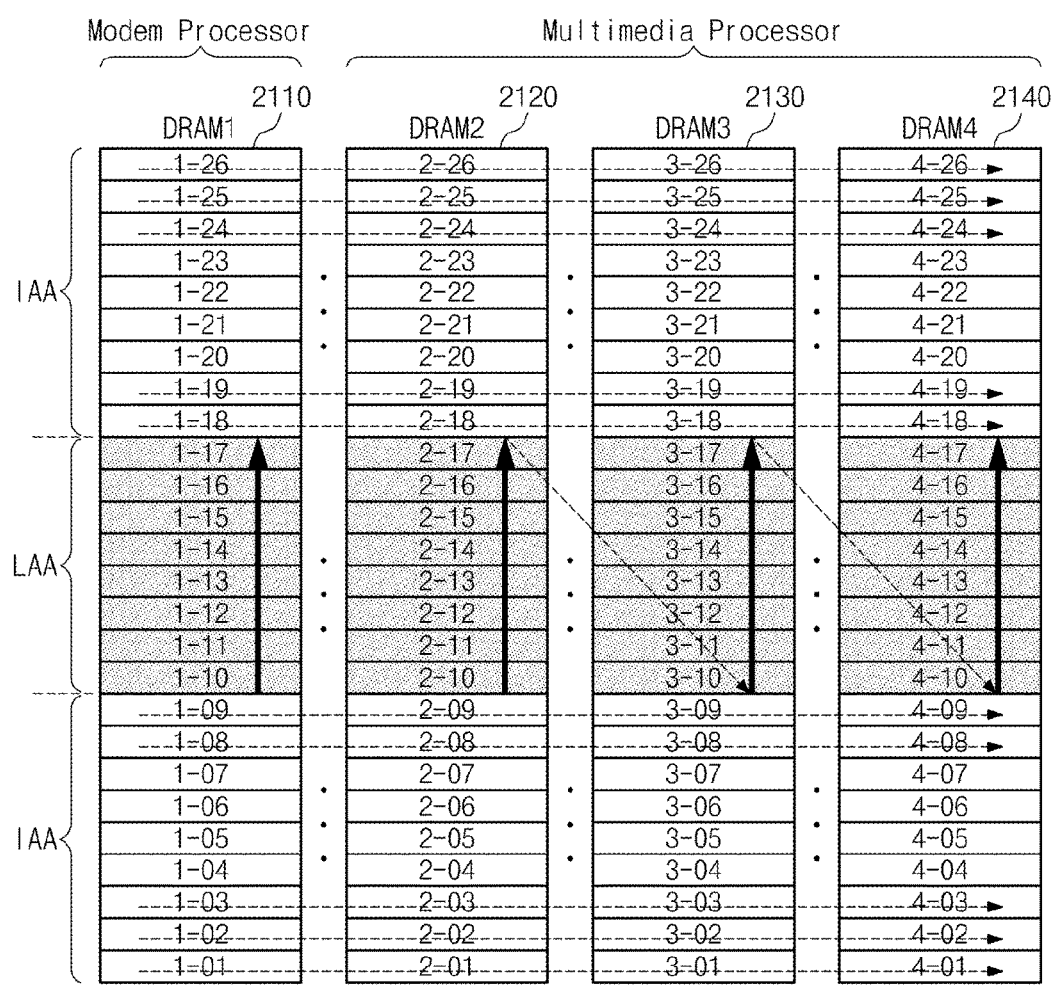

FIGS. 19 and 20 are block diagrams schematically illustrating an address area of a memory system shown in FIG. 18. FIG. 19 shows the event that an interleaving access operation is performed without a linear access operation. FIG. 20 shows the event that a partial linear access operation is performed.

Referring to FIG. 19, an interleaving access operation may be performed over first through fourth DRAMs 2110 through 2140. First address areas 1-01 through 4-01 of the first through fourth DRAMs 2110 through 2140 may be first accessed, second address areas 1-02 through 4-02 of the first through fourth DRAMs 2110 through 2140 may be next accessed, and $26^{th}$ address areas 1-26 through 4-26 of the first through fourth DRAMs 2110 through 2140 may be finally accessed.

Referring to FIG. 20, $1^{st}$ through $9^{th}$ address areas of each the first through fourth DRAMs 2110 through 2140 may constitute an interleaving access area IAA, $10^{th}$ through $17^{th}$ address areas thereof may constitute a linear access area LAA, and $18^{th}$ through $26^{th}$ address areas thereof may constitute an interleaving access area IAA. The linear access areas LAA may be set by first and second linear remappers 2231 and 2232 shown in FIG. 18.

Meanwhile, the linear access area LAA of the first DRAM 2110 may be accessed only by a modem processor 2251, and the linear access areas LAA of the second through fourth DRAMs 2120 through 2140 may be accessed only by a multimedia processor 2252. An independent access area of a specific processor may be set by first and second access windows 2241 and 2242 shown in FIG. 18.

Referring to FIG. 20, an interleaving access operation may be performed over $1^{st}$ through $9^{th}$ address areas of the first through fourth DRAMs 2110 through 2140. Next, a partial linear access operation may be performed with respect to $10^{th}$ through $17^{th}$ address areas 1-10 through 1-17 of the first DRAM 2110, which are only accessed by the modem processor 2251 and are set by the first linear remapper 2231 and the first access window 2241.

Afterwards, the partial linear access operation may be performed with respect to $10^{th}$ through $17^{th}$ address areas 2-10 through 2-17, 3-10 through 3-17, and 4-10 through 4-17 of the second through fourth DRAMs 2120 through 2140, which are accessed only by the multimedia processor 2252 and are set by the second linear remapper 2232 and the second access window 2242. Finally, the interleaving access operation may be performed with respect to $18^{th}$ through $26^{th}$ address areas of each of the first through fourth DRAMs 2110 through 2140.

Figure 21:
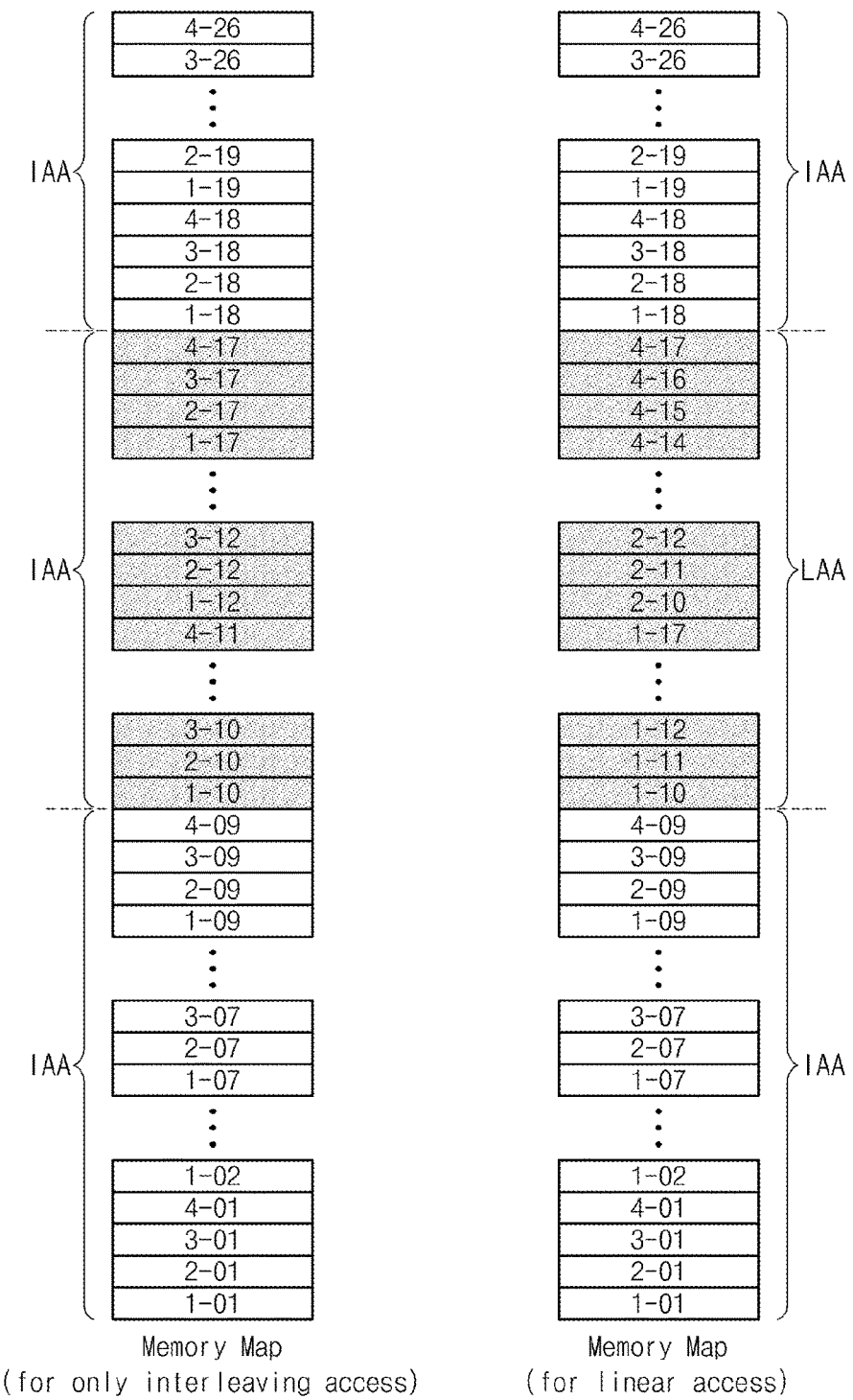
FIG. 21 is a memory map showing an access manner shown in FIGS. 19 and 20.

FIG. 21 is a memory map showing an access manner shown in FIGS. 19 and 20. A left memory map shown in FIG. 21 shows the event that an interleaving access operation shown in FIG. 19 is only performed, and a right memory map shown in FIG. 21 shows the event that an asymmetric linear access operation shown in FIG. 20 is performed. Referring to FIG. 21, an interleaving access area IAA may have the same memory map. A memory map of the linear access area LAA disposed at a right side may be different from that of the interleaving access area IAA that is disposed at a left side and corresponds to the linear access area LAA disposed at a right side.

Figure 22:
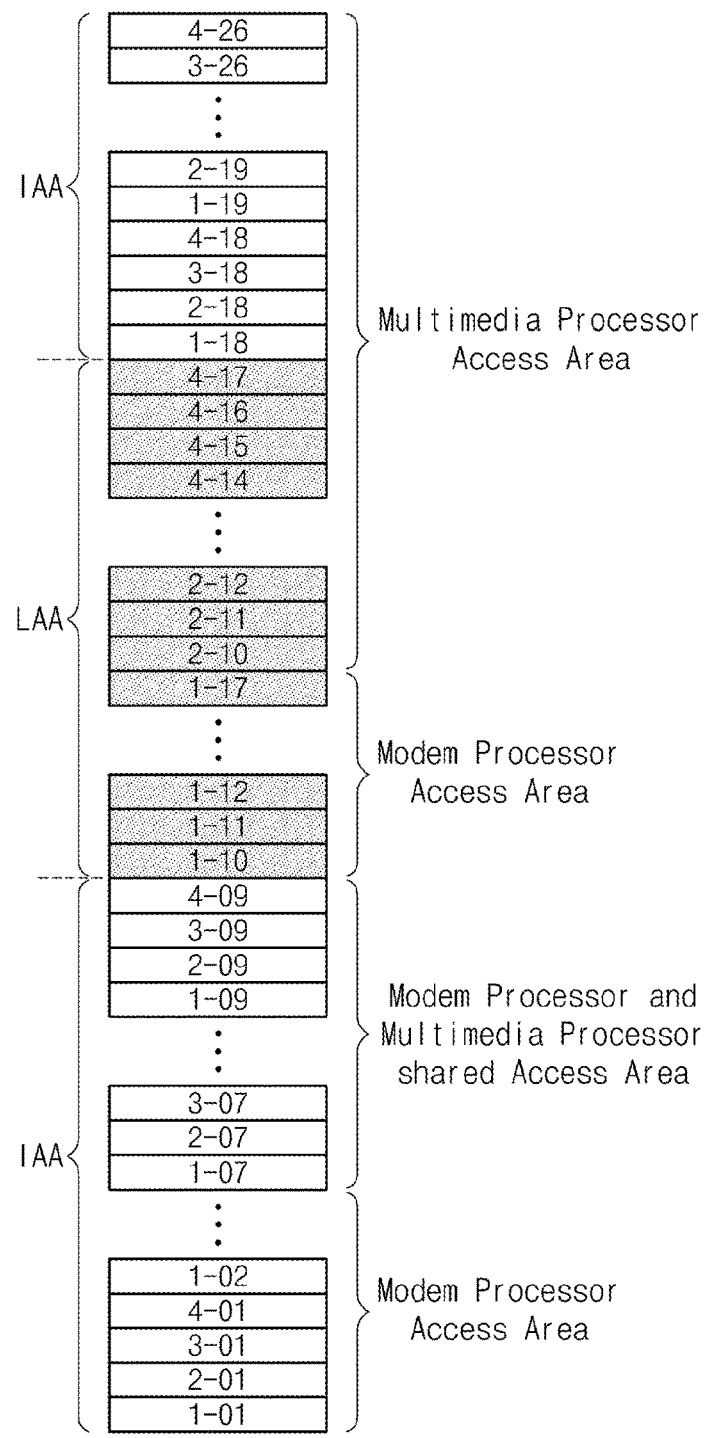
FIG. 22 is a memory map showing an access manner of a memory system shown in FIG. 18.

FIG. 22 is a memory map showing an access manner of a memory system shown in FIG. 18. Referring to FIG. 22, $1^{st}$ through $9^{th}$ address areas 1-01 through 4-09 may constitute an interleaving access area IAA, $10^{th}$ through $17^{th}$ address areas 1-10 through 4-17 may constitute a linear access area LAA, and $18^{th}$ through $26^{th}$ address areas 1-10 through 4-26 may constitute an interleaving access area IAA.

$1^{st}$ through $6^{th}$ address areas 1-01 through 4-06 of the interleaving access area IAA may constitute an access area that a modem processor 2251 (refer to FIG. 18) only accesses. $7^{th}$ through $9^{th}$ address areas 1-07 through 4-09 may be set to a shared access area of the modem processor 2251 and a multimedia processor 2252 (refer to FIG. 18).

A linear access area LAA of a first DRAM 2110 (refer to FIG. 18) may be formed of address areas 1-10, 1-11, 1-12 . . . 1-17 that a modem processor only accesses. Linear access areas LAA of second through fourth DRAMs 2120 through 2140 may be formed of address areas 2-10, 2-11, 2-12 . . . 4-16, 4-17 that the multimedia processor 2252 only accesses. $18^{th}$ through $26^{th}$ address areas 1-18 through 4-26 of the interleaving access area IAA may be set to an access area that the multimedia processor 2252 accesses.

Returning to FIG. 18, a memory system 2000 according to an embodiment of the application may efficiently use, without waste, a memory area to which a linear access operation is applied, by connecting a linear remapper and an access window to each processor. Also, the memory system 2000 according to an embodiment of the application may perform an asymmetric linear access operation. That is, a linear access area of the first DRAM 2110 may be asymmetrical to that of each of the second through fourth DRAMs 2120 through 2140, thereby making it possible to perform the linear access operation asymmetrically.

Figure 23:
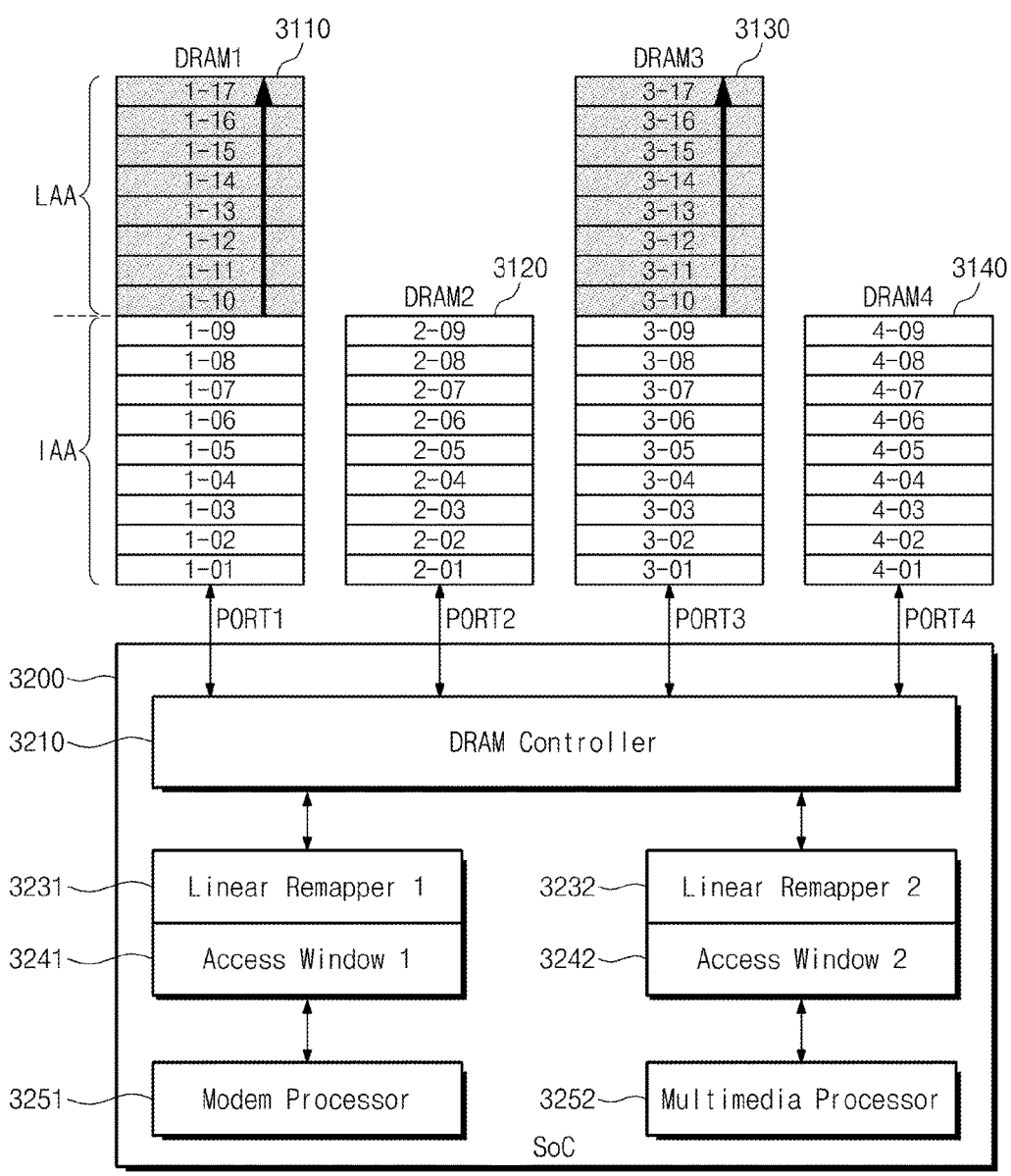
FIG. 23 is a block diagram schematically illustrating a memory system to perform an asymmetric linear access operation, according to a further embodiment of the application.

FIG. 23 is a block diagram schematically illustrating a memory system to perform an asymmetric linear access operation, according to a further embodiment of the application. Referring to FIG. 23, a memory system 3000 may contain first through fourth DRAMs 3110 through 3140 and an application processor 3200 implemented on a system on chip.

The memory system 3000 shown in FIG. 23 may have an asymmetric memory configuration. That is, capacities or address areas of the first through fourth DRAMs 3110 through 3140 may be different from each other. For example, each of the first and third DRAMs 3110 and 3130 may have a linear access area LAA, and each of the second and fourth DRAMs 3120 and 3140 may have an interleaving access area IAA without a linear access area LAA.

The application processor 3200 may include a DRAM controller 3210, first and second linear remappers 3231 and 3232, first and second access windows 3241 and 3242, a modem processor 3251, and a multimedia processor 3252. The DRAM controller 3210 may access the first through fourth DRAMs 3110 through 3140 through first through fourth ports PORT1 through PORT4.

As described above, each of the first and third DRAMs 3110 and 3130 may have the interleaving access area IAA and the linear access area LAA. $1^{st}$ through $9^{th}$ address areas 1-01 through 1-09 and 3-01 through 3-09 may constitute the interleaving access areas IAA, and $10^{th}$ through $17^{th}$ address areas 1-10 through 1-17 and 3-10 through 3-17 may constitute the linear access areas LAA. In contrast, each of the second and fourth DRAMs 3120 and 3140 may only have the interleaving access area IAA. Areas of the second and fourth DRAMs 3120 and 3140 that correspond to the interleaving access areas IAA of the second and fourth DRAMs 3120 and 3140 may be referred to as "no accessible area (NAA)".

The memory system 3000 according to an embodiment of the application may set the no accessible areas NAA of the second and fourth DRAMs 3120 and 3140 using the access windows 3241 and 3242. The memory system 3000 may block accessing of the no accessible areas NAA of the second and fourth DRAMs 3120 and 3140 and may send a decoding error response.

Figure 24:
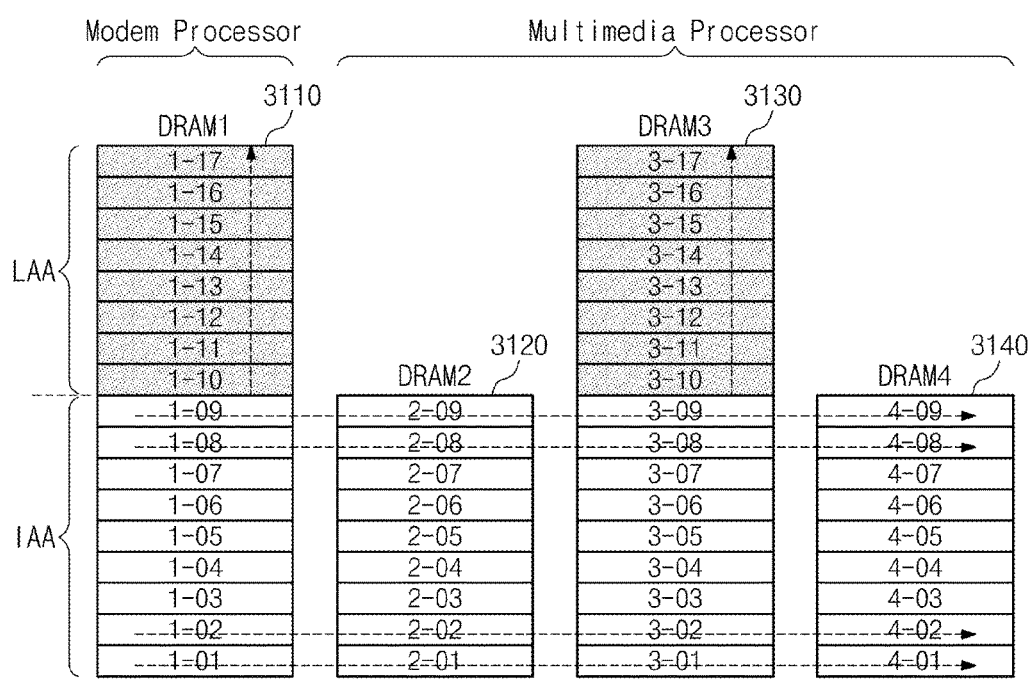
FIG. 24 is a block diagram for describing a linear access operation of a memory system having an asymmetric memory configuration shown in FIG. 23.

FIG. 24 is a block diagram for describing a linear access operation of a memory system having an asymmetric memory configuration shown in FIG. 23. Referring to FIG. 24, $1^{st}$ through $9^{th}$ address areas 1-01 through 4-09 of first through fourth DRAMs 3110 through 3140 may constitute an interleaving access area IAA. $10^{th}$ through $17^{th}$ address areas 1-10 through 1-17 and 3-10 through 3-17 of the first and third DRAMs 3110 and 3130 may constitute a linear access area LAA.

The linear access area LAA of the first DRAM 3110 may be accessed only by a modem processor 3251, and the linear access area LAA of the third DRAM 3130 may be accessed only by a multimedia processor 3252. An independent access area of a specific processor may be set by first and second access windows 3241 and 3242 shown in FIG. 23.

An interleaving access operation may be performed over $1^{st}$ through $9^{th}$ address areas 1-01 through 4-09 of first through fourth DRAMs 3110 through 3140. Next, a linear access operation may be performed with respect to $10^{th}$ through $17^{th}$ address areas 1-10 through 1-17 of the first DRAM 3110, which are accessed only by a modem processor 3251. A linear access operation may be performed with respect to $10^{th}$ through $17^{th}$ address areas 3-10 through 3-17 of the third DRAM 3130, which are accessed only by a multimedia processor 3252.

Figure 25:
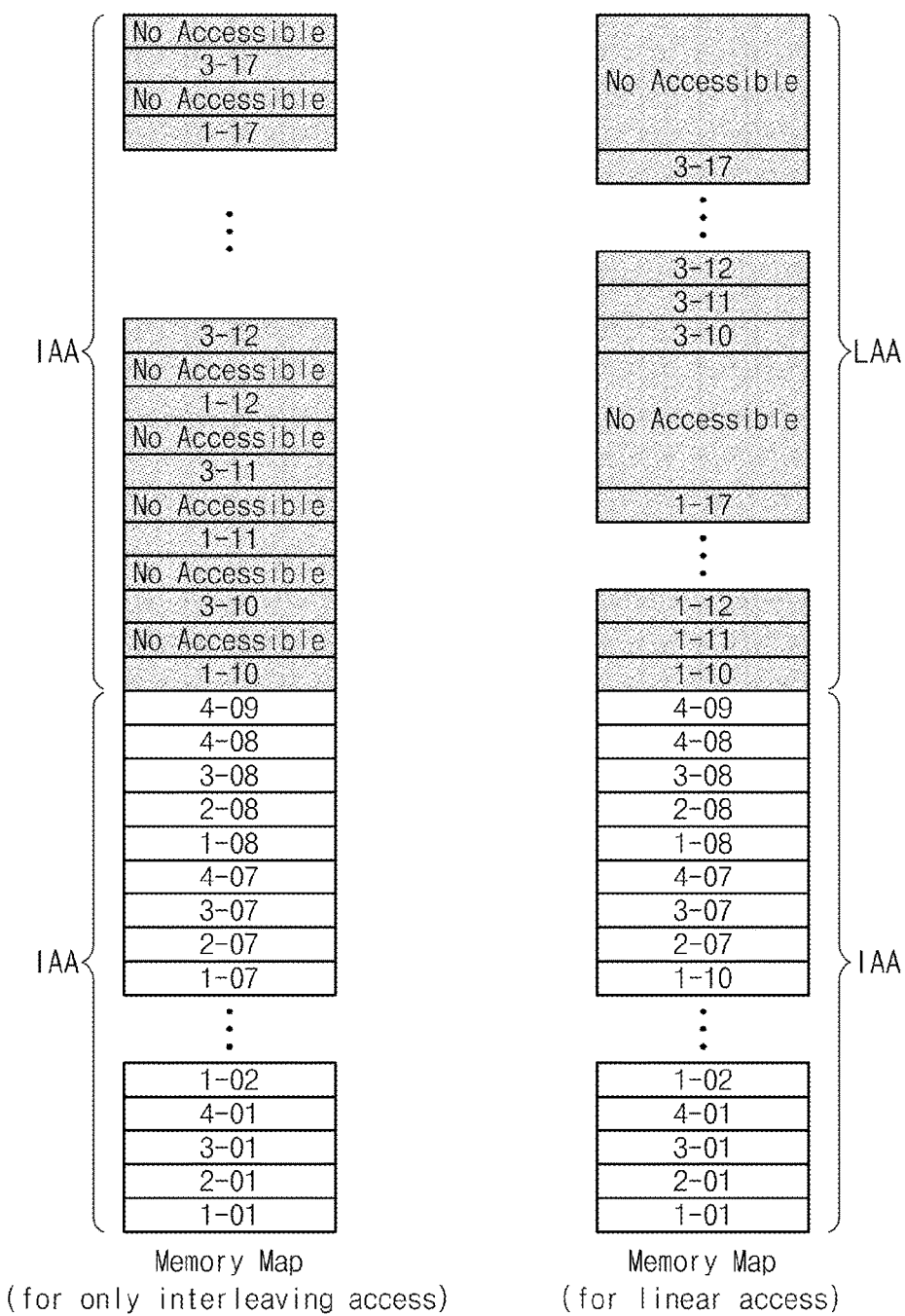
FIG. 25 is a memory map showing an access manner shown in FIG. 23.

FIG. 25 is a memory map showing an access manner shown in FIG. 23. A left memory map shown in FIG. 25 shows the event that an interleaving access operation is only performed, and a right memory map shows the event that a partial linear access operation is performed.

In the event that an interleaving access operation is only performed (left memory map), a memory system 3000 may access a $10^{th}$ address area 1-10 of a first DRAM 3110 and may then access a $10^{th}$ address area 3-10 of a third RAM 3130. $10^{th}$ address areas of second and fourth DRAMs 3130 and 3140 may be no accessible areas NAA. An interleaving access operation may be performed with respect to $11^{th}$ through $17^{th}$ address areas in the same manner as described above.

In the event that a partial linear access operation is performed (right memory map), the memory system 3000 may access $10^{th}$ through $17^{th}$ address areas 1-10 through 1-17 of the first DRAM 3110 and may then access $10^{th}$ through $17^{th}$ address areas 3-10 through 3-17 of the third RAM 3130. $10^{th}$ through $17^{th}$ address areas of the second and fourth DRAMs 3130 and 3140 may be no accessible areas NAA.

As described above, a memory system according to an embodiment of the application may perform a partial linear access operation by connecting a linear remapper to a processor. Also, linear access areas about processors may be set to be different from each other by connecting an access window and a linear remapper to each processor. The application may be designed to have an asymmetric linear access operation (refer to FIG. 18) and an asymmetric memory configuration (refer to FIG. 23).

In embodiments of the application, an access window and a linear remapper may be connected between a processor and a memory controller, thereby making it possible to reduce power consumption and to use a memory efficiently.

A memory system according to an embodiment of the application may be applied to various products. The memory system according to an embodiment of the application may be used in electronic devices, such as digital camera, camcorder, mobile phone, digital TV, PMP, PSP, and PDA.

Figure 26:
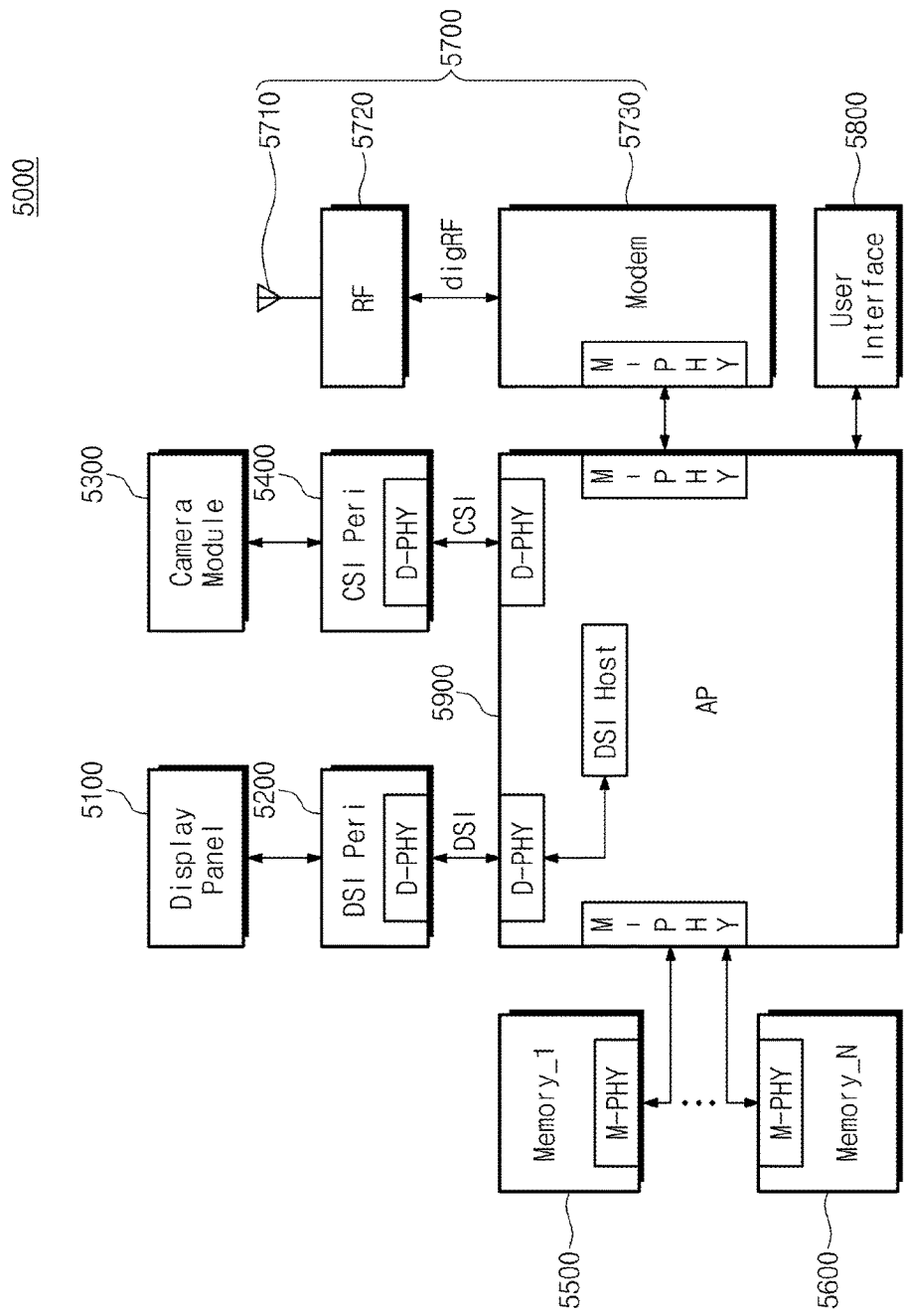
FIG. 26 is a block diagram schematically illustrating a mobile electronic device according to an embodiment of the application.

FIG. 26 is a block diagram schematically illustrating a mobile electronic device according to an embodiment of the application. Referring to FIG. 26, a mobile electronic device 5000 may support the MIPI (mobile industry processor interface) or eDP (Embedded DisplayPort) standard. The mobile electronic device 5000 may contain a display panel 5100, a DSI (display serial interface) peripheral circuit 5200, a camera module 5300, a CSI (camera serial interface) peripheral circuit 5400, first through N-th memories 5500 through 5600, an RF transceiver unit 5700, a user interface 5800, and an application processor 5900.

The display panel 5100 may display image data. The DSI peripheral circuit 5200 may contain a timing controller, a source driver, a gate driver, and so on. A DSI host embedded in the application processor 5900 may perform serial communications with the display panel 5100 through DSI.

The camera module 5300 and the CSI peripheral circuit 5400 may contain a lens, an image sensor, an image processor, and so on. Image data that the camera module 5300 generates may be processed by the image processor, and the processed image may be provided to the application processor 5900 through CSI.

The first through N-th memories 5500 through 5600 may perform communications with the application processor 5900 through an M-PHY layer. The first through N-th memories 5500 through 5600 may perform a partial linear access operation or an asymmetric linear access operation under a control of the application processor 5700 as described above. Also, as illustrated in FIG. 23, the first through N-th memories 5500 through 5600 may have an asymmetric memory configuration.

The RF transceiver unit 5700 may contain an antenna 5710, an RF part 5720, and a modem 5730. An embodiment of the application is exemplified as the modem 5730 performs communications with the application processor 5900 through an M-PHY layer. However, the scope and spirit of the application may not be limited thereto. For example, the modem 5730 may be embedded in the application processor 5900.

A memory system according to an embodiment of the application may be packaged according to any of a variety of different packaging technologies. Examples of such packaging technologies may include the following: PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), and Wafer-Level Processed Stack Package (WSP).

While the application has been described with reference to exemplary embodiments, it will be apparent to those skilled in the art that various changes and modifications may be made without departing from the spirit and scope of the application. Therefore, it should be understood that the above embodiments are not limiting, but illustrative.

What is claimed is:

1. A memory system comprising:
a plurality of memory chips; and
a system on chip connected with the plurality of memory chips, wherein:
the system on chip includes:
first and second processors configured to provide an address for using the plurality of memory chips;
a first access window configured to set an area, accessed only by the first processor, from among address areas of one or more of the plurality of memory chips;
a first linear remapper configured to generate a linear-access memory map from addresses within the area that are received from the first processor; and
a memory controller configured to control a partial linear access operation with respect to the plurality of memory chips, based on the area set by the first access window and the linear-access memory map, wherein:
the first linear remapper generates the linear-access memory map by remapping, for each of the memory chips, consecutively increasing memory addresses of the memory chip, within an interleaved-access memory map, to monotonically increasing memory addresses for accessing a first of the memory chips,
the memory controller applies the partial linear access operation to the first memory chip so as to sequentially access consecutive memory addresses of the first memory chip within the linear-access memory map, and
each of any two consecutive memory addresses within the interleaved-access memory map addresses a different one of the memory chips.

2. The memory system of claim 1, further comprising:
a second access window configured to set an area, accessed only by the second processor, from among address areas of one or more of the plurality of memory chips; and
a second linear remapper configured to remap an address received from the second processor and to provide an address thus remapped to the memory controller, wherein
the memory controller performs a partial linear access operation with respect to the plurality of memory chips, based on the area set by the second access window and the address remapped by the second linear remapper.

3. The memory system of claim 2, wherein the partial linear access operation is performed even though at least one of the plurality of memory chips has an asymmetric memory configuration including a non-accessible area.

4. The memory system of claim 3, wherein the first or second access window sets the non-accessible area.

5. The memory system of claim 4, wherein:
the first access window receives a first CONFIG signal from a special function register (SFR) and sets an independent access area that only the first processor accesses, and
the first linear remapper receives a second CONFIG signal from the SFR and selectively performs an interleaving access operation or a linear access operation with respect to the plurality of memory chips.

6. The memory system of claim 2, wherein:
the first processor is a modem processor, and
the first and second processors, the memory controller, the first and second access windows, and the first and second linear remappers are implemented on the system on chip.

7. The memory system of claim 2, wherein:
the first access window receives a first CONFIG signal from a special function register (SFR) and sets an independent access area that only the first processor accesses, and
the first linear remapper receives a second CONFIG signal from the SFR and selectively performs an interleaving access operation or a linear access operation with respect to the plurality of memory chips.

8. A mobile electronic device comprising:
a display panel configured to display image data;
an RF transceiver unit configured to perform wireless data communications;
a plurality of memory chips configured to store data; and
an application processor connected to the display panel, the RF transceiver unit, and the plurality of memory chips, wherein:
the application processor includes:
first and second processors configured to provide an address for using the plurality of memory chips;
a first access window configured to set an area, accessed only by the first processor, from among address areas of one or more of the plurality of memory chips;
a first linear remapper configured to generate a linear-access memory map from addresses within the area that are received from the first processor; and
a memory controller configured to perform a partial linear access operation with respect to the plurality of memory chips, based on the area set by the first access window and the linear-access memory map, wherein:
the first linear remapper generates the linear-access memory map by remapping, for each of the memory chips, consecutively increasing memory addresses of the memory chip, within an interleaved-access memory map, to monotonically increasing memory addresses for accessing a first of the memory chips, the memory controller applies the partial linear access operation to the first memory chip so as to sequentially access consecutive memory addresses of the first memory chip within the linear-access memory map, and each of any two consecutive memory addresses within the interleaved-access memory map addresses a different one of the memory chips.

9. The mobile electronic device of claim 8, wherein the application processor further includes:

a second access window configured to set an area, accessed only by the second processor, from among address areas of one or more of the plurality of memory chips; and a second linear remapper configured to remap an address received from the second processor and to provide an address thus remapped to the memory controller, wherein the memory controller performs a partial linear access operation with respect to the plurality of memory chips, based on the area set by the second access window and the address remapped by the second linear remapper.

10. A method of accessing memory chips, the method comprising:

accessing, with a first processor, a first memory area within each of the memory chips through an interleaved access operation;

generating a linear-access memory map by remapping, for each of the memory chips, consecutively increasing memory addresses of the memory chip, within an interleaved-access memory map, to monotonically increasing memory addresses for accessing a second memory area within a first of the memory chips through a linear access operation; and accessing, solely with a second processor, the second memory area within the first memory chip solely through the linear access operation so as to sequentially access consecutive memory addresses of the first memory chip within the linear-access memory map, wherein:

each of any two consecutive memory addresses within the interleaved-access memory map addresses a different one of the memory chips, and the second memory area is a same size or larger than the first memory area.

11. The method of claim 10, further comprising accessing, with the second processor, a third memory area, within each of the memory chips through the interleaved access operation.

12. The method of claim 10, further comprising:
accessing, with the first processor, a third memory area within a second of the memory chips, different from the first memory chip, using the linear access operation, wherein the third memory area is a same size or larger than the first memory area.

13. The method of claim 10, wherein if a memory region to be accessed by the second processor exceeds a size of the second memory area, the second processor accesses the second memory area within the first memory chip through the linear access operation and accesses a third memory area of a second of the memory chips, differing from the first memory chip, through the linear access operation.

14. The method of claim 10, wherein:
the second processor accesses the second memory area but the first processor does not, and
both the first and second processors access the first memory area.

15. A memory system that accesses memory chips, the system comprising:

a first processor that accesses a first memory area within each of the memory chips through an interleaved access operation;

a linear remapping component that generates a linear-access memory map by remapping, for each of the memory chips, consecutively increasing memory addresses of the memory chip, within an interleaved-access memory map, to monotonically increasing memory addresses for accessing a second memory area within a first of the memory chips through a linear access operation; and a second processor that solely accesses the second memory area within the first memory chip solely through the linear access operation so as to sequentially access consecutive memory addresses of the first memory chip within the linear-access memory map, wherein:

each of any two consecutive memory addresses within the interleaved-access memory map addresses a different one of the memory chips, and the second memory area is a same size or larger than the first memory area.

16. The memory system of claim 15, wherein the second processor accesses a third memory area within each of the memory chips through the interleaved access operation.

17. The memory system of claim 15, wherein:
the first processor accesses a third memory area within a second of the memory chips, different from the first memory chip, using the linear access operation, and
the third memory area is a same size or larger than the first memory area.

18. The memory system of claim 15, wherein:
the second processor accesses the second memory area but the first processor does not, and
both the first and second processors access the first memory area.

* * * * *